United States Patent [19]

Kolettis et al.

[11] 3,990,050
[45] Nov. 2, 1976

[54] COMPUTER CONTROLLED AUTOMATIC RESPONSE SYSTEM

[75] Inventors: Nicholas John Kolettis, Hightstown; Kevin Christopher O'Brien, East Brunswick; Gerald John Owens, Freehold, all of N.J.

[73] Assignee: Bell Telephone Laboratories, Incorporated, Murray Hill, N.J.

[22] Filed: Sept. 25, 1974

[21] Appl. No.: 509,129

[52] U.S. Cl. ............................................. 340/172.5
[51] Int. Cl.² ............................................. G06F 3/04
[58] Field of Search ............ 340/172.5, 152; 445/1; 179/1, 1 SM, 2 DP, 15 AL, 15 AQ

[56] References Cited
UNITED STATES PATENTS

| | | | |
|---|---|---|---|
| 3,133,268 | 5/1964 | Avakian et al. | 340/152 |
| 3,209,074 | 9/1965 | French | 179/1 |
| 3,253,263 | 5/1966 | Lee et al. | 340/172.5 |
| 3,344,401 | 9/1967 | McDonald et al. | 340/172.5 |
| 3,398,241 | 8/1968 | Lee | 179/1 |
| 3,534,171 | 10/1970 | Shepard et al. | 179/1 |
| 3,566,358 | 2/1971 | Hasbrouck | 445/1 |
| 3,641,496 | 2/1972 | Slavin | 340/152 X |
| 3,678,205 | 7/1972 | Cohen et al. | 179/15 AQ |
| 3,761,894 | 9/1973 | Pilc et al. | 340/172.5 |
| 3,766,531 | 10/1973 | Cooper | 445/1 |

OTHER PUBLICATIONS
Voice Recognition and Response Systems–Weitzman, 12/69, Datamation–pp. 165–170.
Voice Response – Speaks for Itself – Colton, 5/71 – Data Processing Magazine – pp. 26–32.
Automatic Voice Response–Interfacing Man with Machine – 7/74 – Rosenthal et al. – IEEE Spectrum – pp. 61–68.

*Primary Examiner*—Harvey E. Springborn
*Attorney, Agent, or Firm*—Thomas Stafford

[57] ABSTRACT

A multiline inquiry-response system is realized by employing a minicomputer system. Predetermined signals are digitally encoded and stored in a disk memory. In response to requests from one or more lines, the computer central processor determines which digital words are required from the disk. The digital words are read from the disk memory to a plurality of registers in one or more of a plurality of dedicated buffer storage stages in a core memory. Each buffer stage is assigned to a designated output line. A direct memory access output multiplexer (DMAMUX) is employed to read the digital words from the registers in the loaded dedicated buffer storage stages to corresponding output lines without substantial processor control. To this end, the multiplexer monitors address signals transmitted in the computer system to detect which ones of the buffer storage stages include registers that have been loaded with digital words from the disk memory. Then control signals are generated by the multiplexer which are employed to effect reading the digital words from the registers in the loaded buffer storage stages in a prescribed sequence to corresponding requesting lines without programmed intervention of the processor.

13 Claims, 16 Drawing Figures

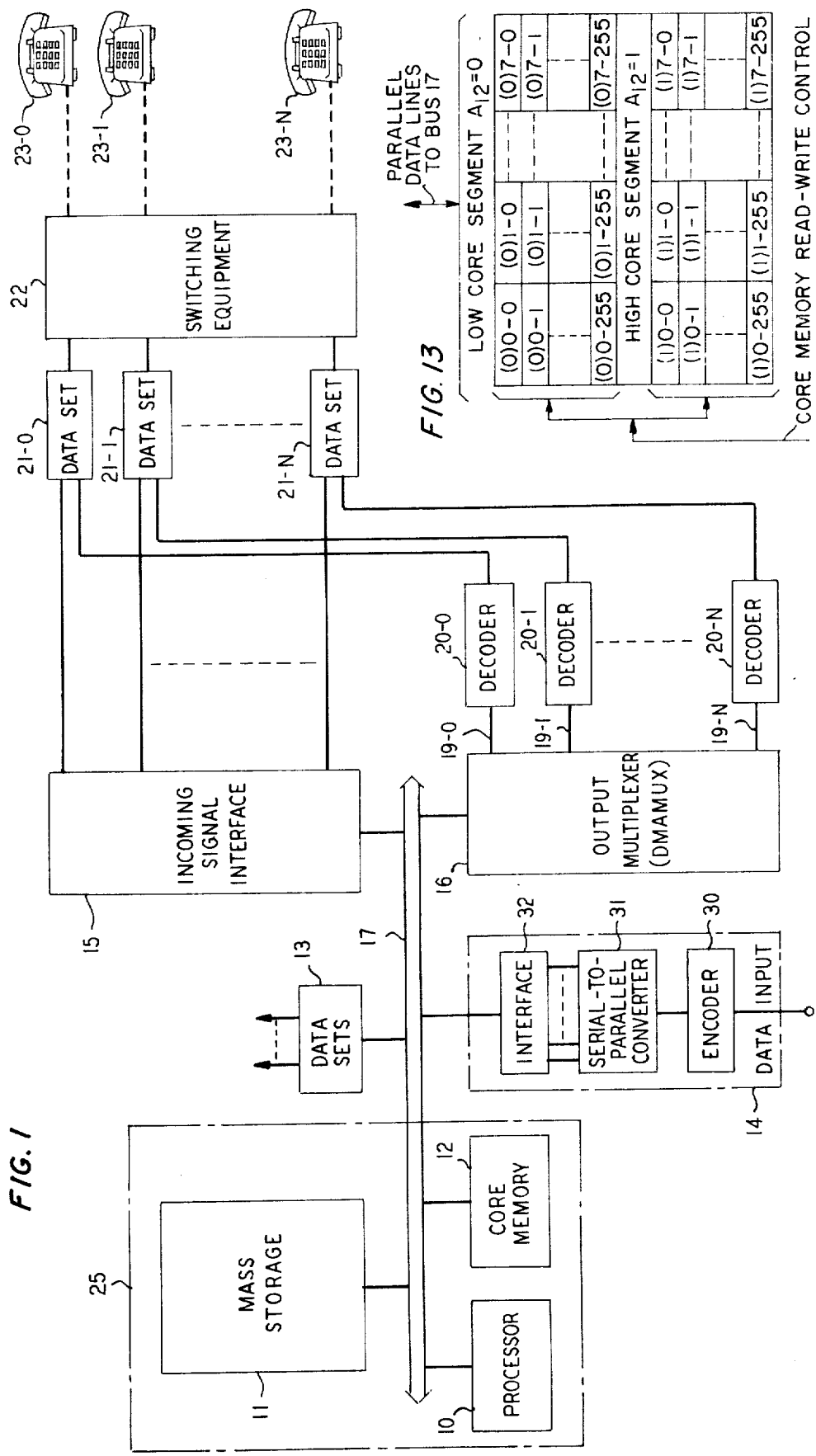

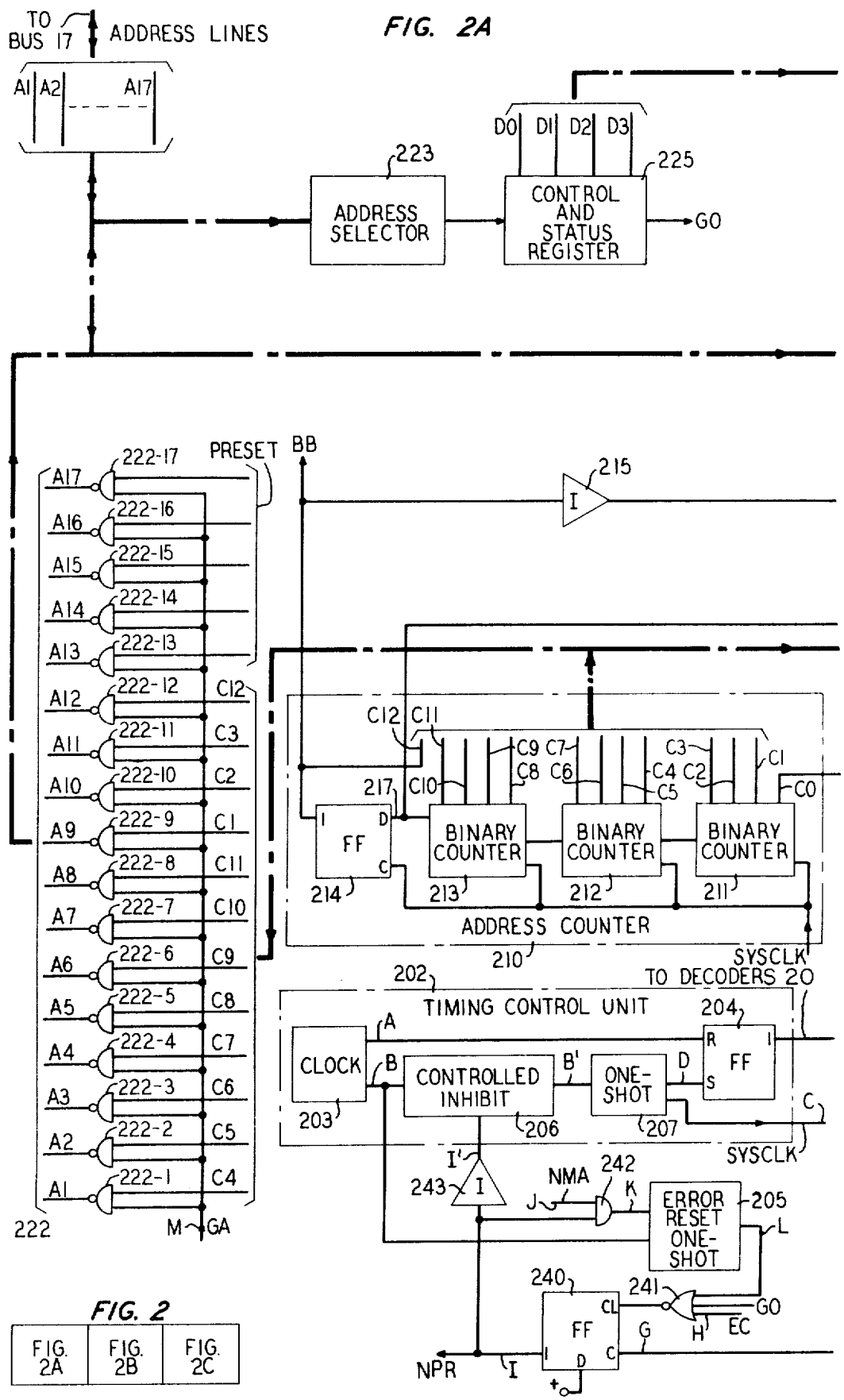

FIG. 2B
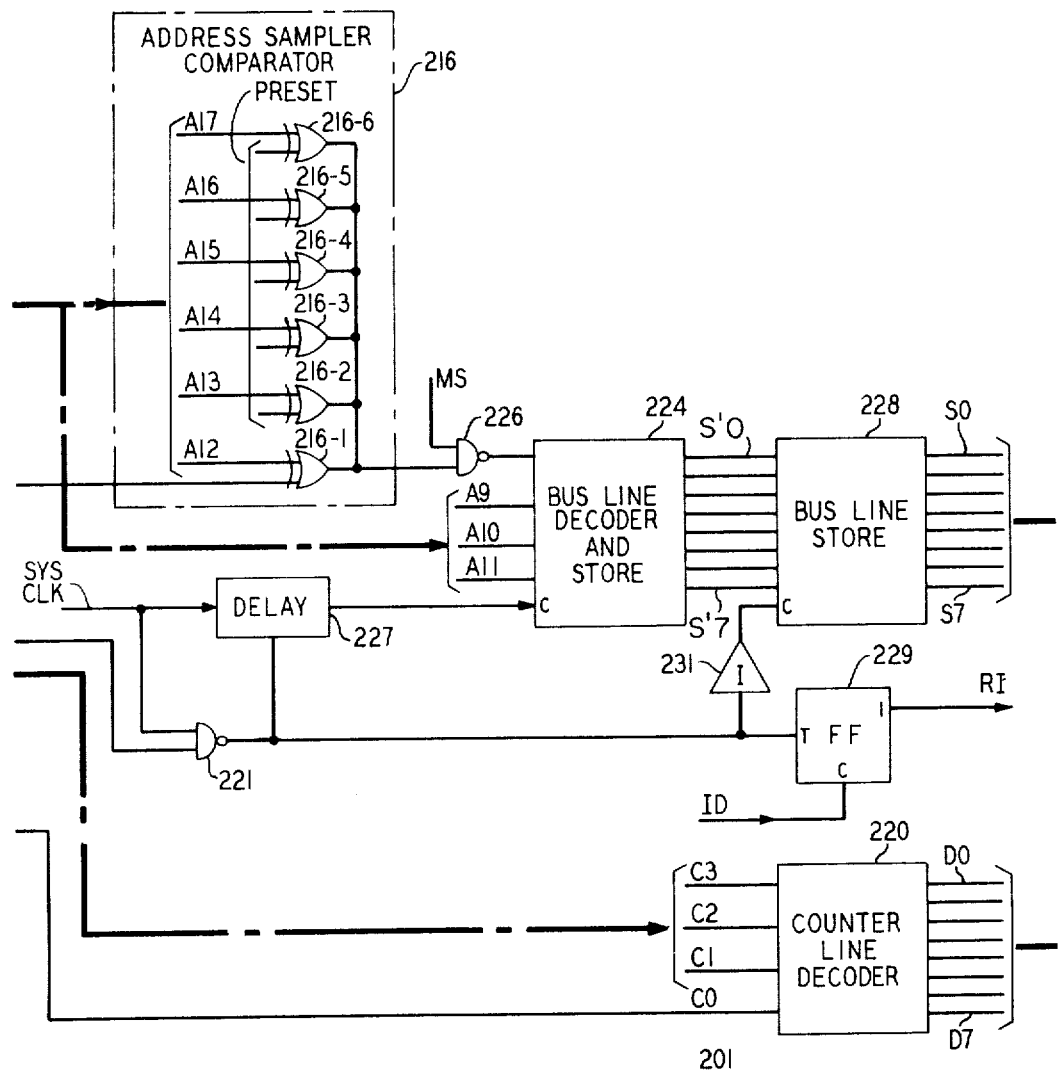
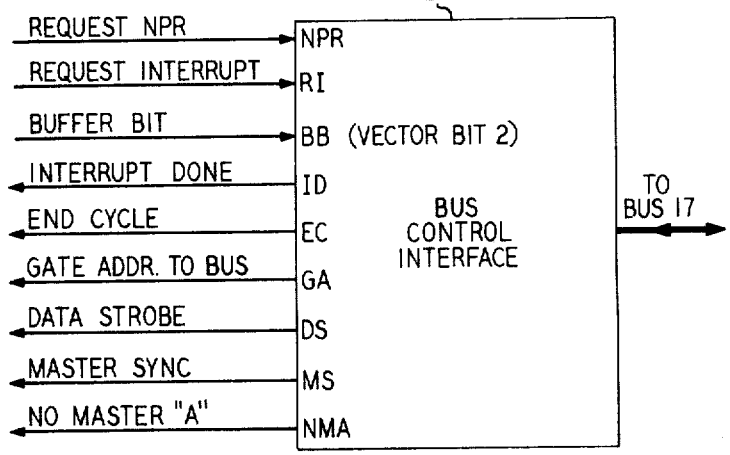

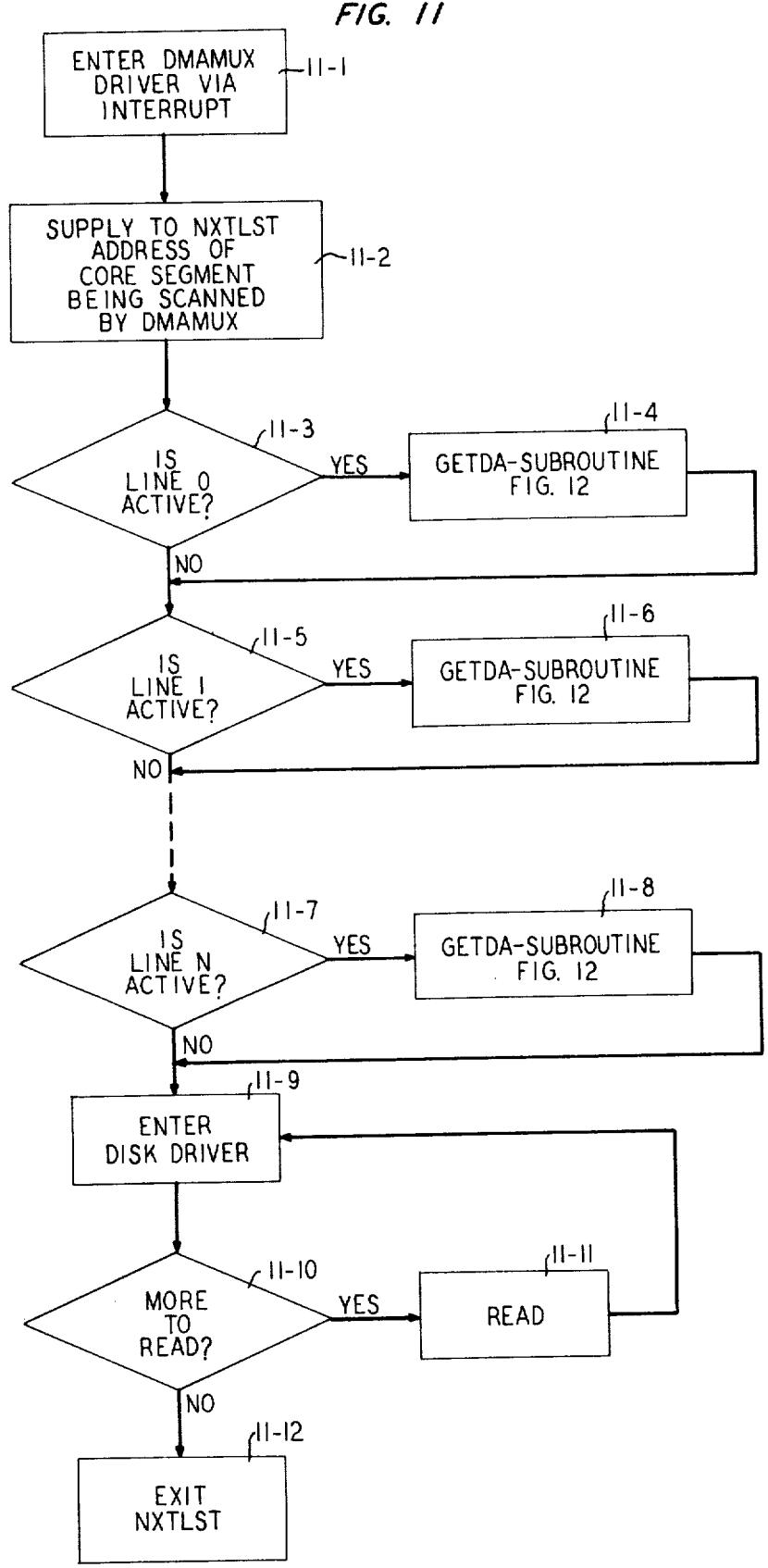

COMPUTER CONTROLLED AUTOMATIC RESPONSE SYSTEM

BACKGROUND OF THE INVENTION

This invention relates to an automatic response system and, more particularly, to an inquiry-response system in which responses are supplied in real time to one or more inquiring lines or stations.

Numerous inquiry-response systems are known in the art. Typically, they include a storage device at a central location having predetermined response messages stored therein to be transmitted to requesting remote stations or the like. To this end, computers including a mass storage device for storing messages or segments thereof, either in analog or digital form, are employed to respond to inquiries via telephone lines or the like from any of now numerous terminal equipments, for example, telephone station sets, multifrequency signaling units, teletypewriters, et cetera. In prior known systems, the computer is programmed to recognize that inquiries have been made, determine an appropriate response, concatenate the response from the stored information and transfer the desired information from the mass storage device to the requesting line and, hence, the requesting station or terminal equipment. In some known systems, digital words representing segments of speech are transferred from the mass storage device to an output buffer and then to the requesting lines. Additionally, some systems are arranged to handle requests from a plurality of lines simultaneously. This is achieved by employing input and output multiplexers. In general, the output multiplexers have included buffer stages for temporarily storing the analog or digital signals which make up the desired response message to be outputted. For the most part, these prior known systems have employed complex and expensive arrangements for obtaining the desired speech output. Thus, although they may be satisfactory for some applications, they are unattractive for others from a commercial standpoint.

SUMMARY OF THE INVENTION

These and other problems are resolved in accordance with the inventive principles described herein in an automatic inquiry-response system by employing an output multiplexer arrangement that is operative to output digital code words to requesting lines in substantially real time. The inquiry-response system includes, in part, a central processor, mass storage unit, memory unit including buffer storage stages and an output multiplexer. Digital words representing predetermined message segments, for example, speech segments, are stored in the storage unit which are retrieved under program control in response to incoming requests. To this end, digital words representing segments of response messages are transferred from the mass storage unit into a plurality of registers or buffers in one or more dedicated buffer storage stages in the memory unit corresponding to requesting lines. The buffer storage stages are arranged in sequential order and correspond on a one-to-one basis to individual ones of a plurality of output lines. Transfer of the digital words from the dedicated buffer storage stages to corresponding requesting lines is initiated and completed under control of the multiplexer without intervention of the central processor. This output transfer is achieved, in accordance with one aspect of the invention, under control of the multiplexer by monitoring addresses of the dedicated buffer storage stages to determine that digital words to be outputted have been supplied to registers in one or more of the dedicated buffer storage stages in the memory unit. Once it has been determined that one or more of the buffer stages have been loaded with digital words, the multiplexer effects reading of the digital words from the loaded buffer stages and supplying them to the requesting lines without processor intervention.

It is desirable to respond to a number of incoming requests simultaneously and in "real-time." This real-time response is achieved, in accordance with another aspect of the invention, by reading out the digital words from the registers in the loaded ones of the core buffer stages in a prescribed sequence. Specifically, the output multiplexer generates signals for controlling the transfer of digital words from the memory unit so that the digital words in registers in the loaded buffer storage stages are read in the prescribed sequence beginning with the first register in the first loaded buffer storage stage in the sequential arrangement of buffer storage stages through the first register in the last loaded buffer storage stage in the sequential arrangement of buffer storage stages, then the second register in the first loaded buffer storage stage through the second register of the last loaded buffer storage stage, and so on through the last register in the last loaded buffer storage stage in the sequential arrangement of buffer storage stages. This readout sequence is realized by supplying address signals from the multiplexer only for registers in loaded buffer storage stages. Consequently, only the registers in loaded ones of the buffer storage stages are read in the prescribed sequence set forth above. If registers in particular buffer stages have not been loaded, a silence code is supplied to the corresponding output lines during the intervals that digital data words would normally be read out.

BRIEF DESCRIPTION OF THE DRAWINGS

These and other objects and advantages of the invention will be more fully understood from the following detailed description taken in accordance with the appended drawings in which:

FIG. 1 shows in simplified block diagram form a response system employing the invention;

FIG. 2 illustrates the relationship of FIGS. 2A, 2B and 2C;

FIGS. 2A, 2B and 2C show details of the output multiplexer used in the system of FIG. 1 illustrating the invention;

FIG. 11 depicts in simplified form a flow chart useful in describing the NXTLST program routine used in operation of the system;

FIG. 13 shows in simplified form the buffer storage stages of core memory 12 of FIG. 1.

DETAILED DESCRIPTION

Figure 2C:
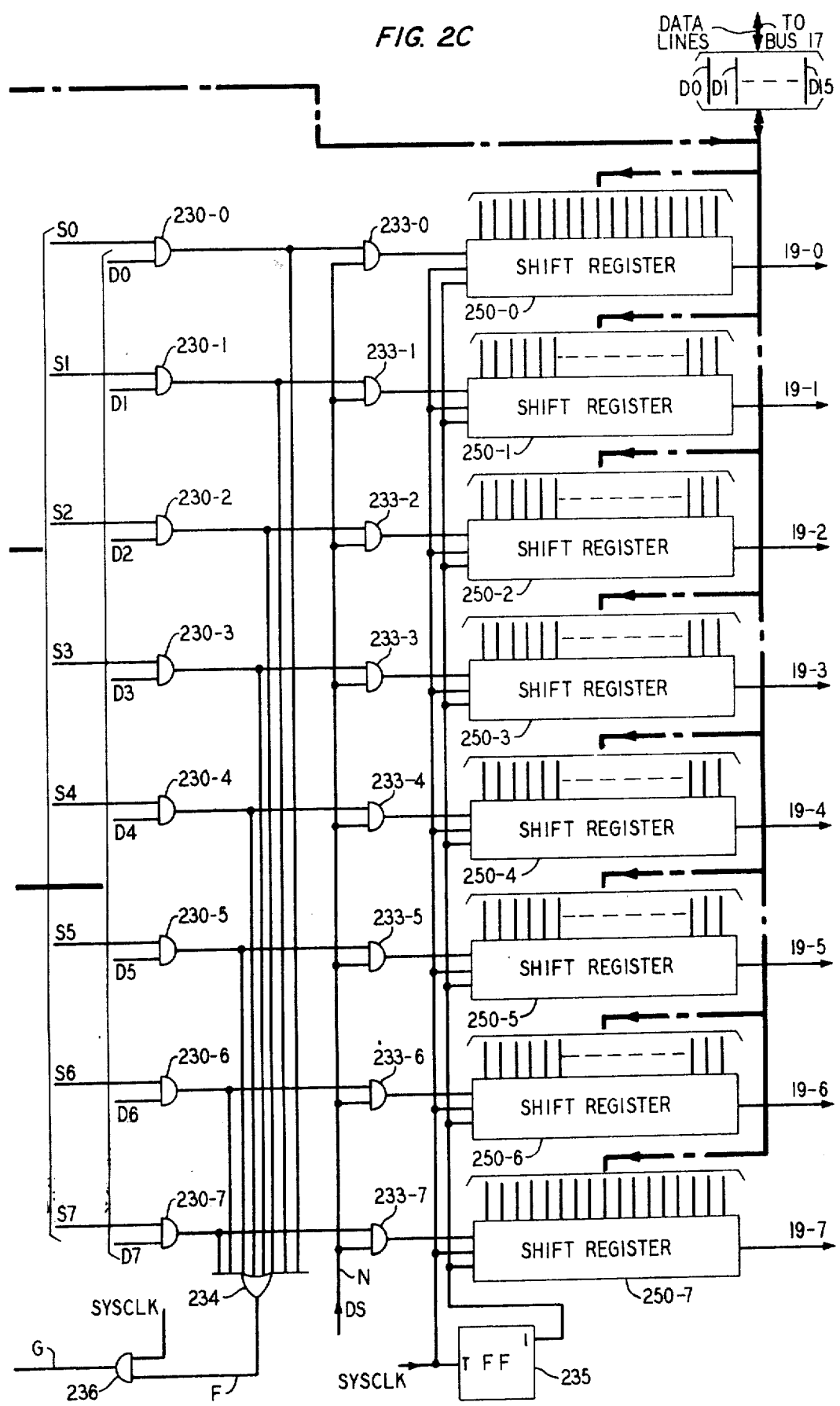

FIG. 1 shows in simplified block diagram form an automatic response system which employs the instant invention. Accordingly, shown are processor 10, mass storage unit 11, core memory 12, data sets 13, data input unit 14, incoming signal interface 15, output multiplexer (DMAMUX) 16, output decoders 20-0 through 20-N, data sets 21-O through 21-N, switching equipment 22 and input-output devices 23-O through 23-N. Equipments 10 through 16 are connected in circuit relationship via input-output (I/O) bus 17.

Processor 10, mass storage unit 11, and core memory unit 12 as interconnected via bus 17 form general purpose computer 25. Computer 25 is employed to store and retrieve from storage digital information as required. Numerous such computer systems are now well known in the art. However, in the practice of this invention it is important that computer system 25 has a particular architecture or otherwise is arranged so that output multiplexer 16 is supplied with at least the addresses of digital signals being supplied from mass storage unit 11 to preassigned dedicated buffer stages in core memory 12. Multiplexer 16, in accordance with one aspect of the invention, monitors the addresses of the dedicated buffer stages to determine without computer intervention that core memory 12 has been supplied with data to be outputted. Then, multiplexer 16 initiates and controls the transfer of digital words from the buffer stages of core memory 12 in a prescribed sequence to effect "real-time" outputs to requesting lines.

In one embodiment of the instant response system, processor 10 is a PDP-11/10 processor unit manufactured by Digital Equipment Corporation. PDP-11/10 processor units are commercially available and are found in widespread use in the art. Details of the PDP-11/10 processor and instructions relating to its use are found in a manual entitled PDP-11/05/10/35/40 Processor Handbook, Digital Equipment Corporation, 1973.

Bus 17 is employed to interconnect all of equipments 10 through 16 and to allow communications and transfers of data between the equipments. A typical system architecture employing bus 17 is described in the PDP-11/05/10/35/40 Processor Handbook, cited above, beginning at page 2-1, and PDP-11 Peripherals Handbook, Programming-Interfacing, Digital Equipment Corporation, 1973, beginning at page 5-1.

It is the so-called master-slave capability of the PDP-11 system architecture which is being turned to account to realize the instant invention. This master-slave operation is described in detail in the PDP-11 Processor Handbook, cited above, beginning at page 2-1 and in the PDP-11 Peripherals Handbook, cited above, beginning at page 5-1.

Mass storage 11 may be any one of the mass storage devices known in the art. It must be of a type capable of or modified to interface with bus 17 and the computer system being employed. Preferably, a disk memory is used, for example, an RF/RS-11 disk memory manufactured by Digital Equipment Corporation and commercially available. Details of the RF/RS-11 disk memory, its use and operation may be found in the PDP-11 Peripherals Handbook, cited above, beginning at page 4-272.

Similarly, core memory 12 may be any one of a number of core memories now well known in the art, provided that it is capable of or modified to interface with bus 17 and other equipments connected thereto. For example, the ME11-L core memory unit contained in the PDP-11 processor unit is satisfactory. The ME11-L unit is the same as the MF11-L unit commercially available from Digital Equipment Corporation; see the PDP-11 Peripherals Handbook, cited above, beginning at page 4-245.

In this example, core memory 12 includes at least two dedicated segments of buffer storage stages each segment having a number of buffer stages equal to the number of incoming and outgoing lines. Thus, for a system having N outgoing lines, each of the segments of core memory 12 has N buffer stages in a serial arrangement. For purposes of illustrating this invention, an eight line (N=8) system is assumed. Accordingly, core memory 12 includes two dedicated segments having eight buffer stages each, namely stage 0 through 7 as shown in FIG. 13. The buffer stages have consecutive addresses. In this example, each buffer stage includes 256 registers or buffers and therefore has the capability of storing 256 digital data words. The 256 words correspond to a data block representing one-sixth second of a desired message, for example, a segment of speech. The core segments are designated high and low and are arranged so that the buffer stages in one of the core segments are being loaded while the buffer stages in the other core segment are being unloaded. This operation will be further discussed below in relation to output multiplexer 16. Each buffer stage in core memory 12 has a designated address which corresponds to a designated output line. Thus, for example, buffer stage 0 of both the high and low storage segments has a preassigned address corresponding to line 0. Each register or buffer, i.e., digital word position in each of the buffer stages also has a preassigned address.

In the PDP-11/10 system, an 18-bit address scheme is employed, namely $A_0$ through $A_{17}$. However, only $A_1$ through $A_{17}$ are employed in the practice of this invention. Briefly, $A_1$ through $A_8$ represent the address of the digital word locations, i.e., the register or buffers in each buffer stage, $A_9$ through $A_{11}$ represent the addresses of the buffer stages, and hence, the incoming and outgoing lines, $A_{12}$ represents the core segment high or low, and $A_{13}$ through $A_{17}$ represent the location of the core segments within core memory 12. Use of this address scheme in the practice of the invention is further described below in relation to output multiplexer 16.

Data segments are stored in digital form in mass storage unit 11 which are concatenated under program control via processor 10 and core 12 to form responses to incoming requests. For purposes of this example, it is assumed that predetermined speech segments are encoded and stored in digital word form in blocks of 256 words in sectors of the disk memory of storage unit 11 in well-known fashion. The digital code words are later retrieved and concatenated into desired responses.

Thus, predetermined voice segments are supplied to data input 14 to be converted into suitable form and supplied via core 12 for storage in the disk memory of mass storage unit 11. To this end, data input 14 includes encoder 30, serial-to-parallel converter 31 and interface unit 32. Encoder 30 may be any one of numerous devices capable of converting analog voice signals into coded digital form, for example, pulse code modulated signals. In the instant system, an adaptive delta modulator type encoder is employed. One such encoder is described in copending patent application of S. J. Brolin, Ser. No. 468,449, filed May 9, 1974 now U.S. Pat. 3,899,754 issued Aug. 12, 1975. It is important that encoder 30 and decoders 20 be compatible. A decoder which may be employed in the instant circuit is also disclosed in the Brolin patent application cited above. The output from encoder 30 is in serial form and is converted into parallel form by serial-to-parallel converter 31. Converter 31 may simply be a shift register which writes out its stages at a periodic rate, for example, after each group of 16 bits has been supplied at a 24 kilobit per second rate. The parallel 16-bit output from converter 31 corresponds to the 16-bit data word employed in the PDP-11/10 system. The parallel output from converter 31 is supplied to interface unit 32 which is employed to supply, in well-known fashion, the digital code words into buffer stages in core memory 12. In this example, a DR11-B general purpose interface unit manufactured by Digital Equipment Corporation and commercially available is employed as interface 2. Details of the DR11-B interface are described in the PDP-11 Peripherals Handbook, cited above beginning at page 4-160.

Transfer of the input encoded digital words from core memory 12 into the disk memory of mass storage unit 11 is also achieved in well-known fashion by employing commercially available software. In this example, Digital Equipment Corporation DOS-Batch Monitor and Assembler programs are employed in straightforward fashion.

Data sets 13 are shown for purposes of indicating that the response system disclosed, may, in formulating a proper response in a given application, have need to communicate with other systems or data banks. Data sets 13 are not required for operation of the instant invention and will not be further discussed.

Incoming requests to the instant response system are generated at remote locations, in well-known fashion, by employing any one of numerous terminal devices. For example, requests may be made via teletypewriters, dial telephone station sets, multifrequency pads, multifrequency signaling telephone station sets or the like. In this example, multifrequency signaling telephone station sets 23 are employed for this purpose. Thus, requests may be initiated from one or more of station sets 23-0 through 23-N by outputting an appropriate sequences of multifrequency tones which are employed to connect the requesting line or lines via switching equipment 22 to one or more of data sets 21 and, hence, via incoming signal interface 15 and bus 17 to computer 25. Multifrequency tones are thereafter outputted from station sets 23 to communicate in well-known fashion with computer system 25.

Data sets 21 are employed to convert the standard multifrequency tones employed in telephone signaling, to two-out-of-eight coded direct current signals. A model 407 type data set manufactured by Western Electric Company and commercially available may be employed for this purpose.

The two-out-of-eight output from each of data sets 21 is converted into binary form by interface 15 and supplied via bus 17 to computer 25 for further processing as desired. Interface 15 may take on any form capable of converting the two-out-of-eight output from data sets 21 into binary form. Straightforward logic techniques are employed for this purpose. One example of a two-out-of-N to binary interface is disclosed in U. S. Pat. 3,680,081, issued July 25, 1972.

It should be noted that each equipment connected to bus 17 includes a standard interface for connecting the equipment properly to the bus and for controlling transfer of information from one equipment to another via bus 17. These interfaces are standard equipments and available commercially. See, for example, the PDP-11 Peripherals Handbook, cited above, for details and operation of these interface units.

Output multiplexer 16 is a direct memory access multiplexer (DMAMUX) which is employed to control system timing and to initiate and supply data in the form of digital words from registers or buffers in dedicated buffer stages in core memory 12 to output decoders 20 and, hence, requesting terminals 23, in accordance with the invention, without intervention of processor 10 and/or program control over the output function. This is achieved, in accordance with one aspect of the invention, by monitoring first addresses being transmitted on bus 17 to determined that registers in one or more of the dedicated core buffer stages of core memory 12 have been supplied with data to be outputted to the corresponding requesting lines. Upon detection that registers in one or more of the buffer stages have been loaded, multiplexer 16 generates a "nonprocessor request" (NPR) thereby assuming "mastership" of bus 17 and transferring the digital words from the core buffer stages to associated ones of decoders 20 and, hence, the requesting lines.

It is important that the outputs from multiplexer 16 are effected in substantially "real-time". In this example, eight (8) output lines are being serviced. The desired real-time outputs to the eight lines are achieved in multiplexer 16, in accordance with another aspect of the invention, by reading out the digital code words from the core buffer stages in a prescribed sequence. Specifically, under control of multiplexer 16, the digital words in the first registers of the loaded dedicated buffer storage stages are supplied to corresponding ones of lines 19, in sequential order beginning with the first register of the first loaded buffer storage stage through the first register of the last loaded buffer storage stage in the sequential arrangement of buffer storage stages. Then, the digital words in the second registers of the loaded buffer storage stages are outputted in the above sequential order to corresponding ones of lines 19 and so on until all 256 digital words from each loaded buffer stage of the core section being read have been outputted. This output technique allows use of a simplified timing arrangement and simplifies the multiplexer design. As stated above, while the registers in the buffer stages of, for example, the "high" core buffer segment are being read, processor 10 is loading the buffer stages of the "low" core segment with the next locks of 256 digital words to be outputted to the appropriate requesting lines during the next one-sixth second system cycle. If the lines are not active or if a pause between words in a message is called for, a silence code signal is supplied to the appropriate ones of the lines during intervals in which data words would normally be outputted.

The digital word outputs from multiplexer 16 are supplied in serial form via lines 19 to decoders 20 for conversion into audio speech signals. The audio outputs from decoders 20 are supplied to appropriate ones of data sets 21 and, subsequently, via switching equipment 22 to the requesting ones of station sets 23.

Details of output multiplexer 16 are shown in simplified block diagram form in FIGS. 2A, 2B and 2C which are inter-related to form multiplexer 16 as shown in FIG. 2. As stated above, multiplexer 16 initiates and controls the transfer of digital words from core memory 2 (FIG. 1) to decoders 20. This is achieved, in part, by monitoring addresses transmitted on bus 17 to determine that registers in one or more of the dedicated core buffer stages of core memory 12 have been loaded and, then, effecting, without substantial processor intervention, reading the data words from registers in the core buffer stage or stages to the appropriate one or ones of decoders 20. Reading out of the core buffer stages is realized by multiplexer 16 obtaining "control" of bus 17, namely, by obtaining mastership of bus 17 and operating core memory 12 as a slave unit. It should be recognized that processor 10 is involved to a minor extent in the output function, since processor 10 must grant "mastership" of bus 17 to multiplexer 16 on request and since processor 10 must effect the transfer of data words from mass storage 11 to core 12. However, the initiation and control of the outputting of data words from the loaded buffer storage stages of core memory 12 to decoders 20 is effected, in accordance with the invention, by multiplexer 16.

In order to generate signals for controlling bus 17 and other system functions, bus control interface 201 (FIG. 2) is employed. Bus control interface 201 responds to signals generated in multiplexer 16, by processor 10 and core memory 12 to generate predetermined control signals, for example, a request interrupt (RI) signal for gaining access to processor 10 and a nonprocessor request (NPR) to gain mastership of bus 17. Additionally, a buffer bit (BB) signal generated in multiplexer 16 is supplied via interface 201 to processor 10 to indicate which core segment is to be loaded during the next system cycle. Similarly, interface 201 supplies signals used in the operation of multiplexer 16, for example, interrupt done (ID), end of cycle (EC), gate address to bus 17 (GA), data strobe (DS), master sync (MS) and no master A (NMA). These control signals and their functions are described in more detail below in relation to the details and operation of multiplexer 16. Units which may be employed for bus control interface 201 are manufactured by Digital Equipment Corporation and are commercially available. In one embodiment of the invention an M796 bus master control module and an M7821 interrupt control module are employed. Details and operation of the M796 and M7821 units are described in the PDP-11 Peripherals Handbook, cited above beginning at pages 6–17 and 6–25, respectively.

Figure 3:
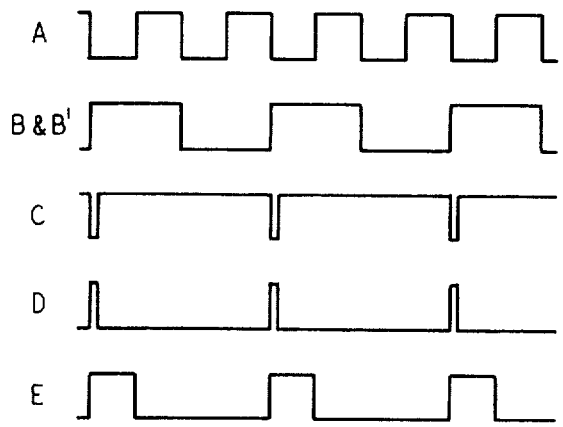
FIG. 3 depicts a sequence of waveforms useful in describing operation of the timing control unit of FIG. 2.

Multiplexer 16 also generates signals for controlling system operation on a periodic internal basis, i.e., a so-called system cycle basis. The system cycle interval corresponds approximately to one-sixth second. To this end, timing control unit 202 normally generates a sequence of signals as shown in FIG. 3. The waveforms shown in FIG. 3 have been labelled to correspond to the circuit points of timing control unit 202 of FIG. 2. Accordingly, clock 203 generates a first pulsating signal, as shown in waveform A, FIG. 3 having a first predetermined frequency, for example, 48 kilohertz. This first output from clock 203 is supplied to the reset input (R) of flip-flop 204. Clock 203 also generates a second pulsating signal, as shown in waveform B, FIG. 3, having a second predetermined frequency, for example, 24 kilohertz. Any one of numerous signal generator arrangements may be employed for this purpose. Typically, an oscillator arrangement is employed which generates a square wave signal having a first predetermined frequency. Square wave signals having other desired frequencies are obtained by employing digital dividers. In this example, a toggle flip-flop (not shown), supplied with the 48 kilohertz signal, is employed to generates the 24 kilohertz signal in well-known fashion.

The second pulsating signal output from clock 203, i.e., the 24 kilohertz signal, is supplied to one input of error reset one-shot 205 and to controlled inhibit unit 206. Details and operation of controlled inhibit unit 206 are described below. For purposes of this portion of the description it is assumed that controlled inhibit unit 206 does not inhibit or otherwise delay the second output from clock 203. Consequently, waveform B' of FIG. 3 is identical to waveform B and the 24 kilohertz signal is supplied to an input of one-shot 207. The unstable interval of one-shot 207 is set at a predetermined value to obtain a first pulsating signal having narrower width pulses, for example, a pulse width of approximately 250 nanoseconds, generated at a 24 kilobit per second rate, as shown in waveform C of FIG. 3. This signal is the system clock signal designated SYSCLK and is supplied to a number of circuit points as indicated on FIG. 2. One-shot 207 also generates a second pulsating signal which is the complement of the SYSCLK signal, as shown in waveform D of FIG. 3. The second output from one-shot 207 is supplied to the set input of flip-flop 204. Consequently, flip-flop 204 is set and reset to yield a signal at its 1 output as shown in waveform E of FIG. 3. The output from flip-flop 204 has a predetermined one-quarter period three-quarter period duty cycle required to drive decoders 20 (FIG. 1).

As stated above, the digital words to be out-putted are supplied to two segments of core memory 12 (FIG. 13) each including 8 sequential buffer storage stages, namely stages 0 through 7, and each storage stage includes 256 registers or buffers each capable of storing a 16-bit digital word. Accordingly, address counter 210, in response to the SYSCLK pulse signal, generates second address signals representative of which core segment is being loaded and unloaded during the current system cycle, namely, address bit $A_{12}$ and buffer bit (BB), which buffer stage is being read out, namely, address bits $A_9$, $A_{10}$ and $A_{11}$, and which registers, i.e., word location in the buffer stages is being read out, namely, address bits $A_1$ through $A_8$. Counter 210 also generates a signal used to inhibit periodically the outputs from counter line decoder 220, namely, $C_0$, and a signal used to enable NAND gate 221. To this end, counter 210 includes three 4-bit binary counters, 211, 212 and 213 connected in tandem and D-type flip-flop 214. Counters 211, 212 and 213 may be Texas Instruments integrated circuit synchronous 4-bit counter type SN74161N. Flip-flop 214 may be any of numerous circuit arrangements now well known in the art.

Table 1 shows, in part, the logical signal representations of the outputs from address counter 210 and their corresponding core buffer stage addresses. It is noted that the buffer stage address generated by counter 210 changes in response to every other SYSCLK pulse. The reason for this will be explained below in relation to output registers 250.

and via inverter 215 to address sampler comparator 216. Outputs $C_0$, $C_1$, $C_2$ and $C_3$ of counter 210 are connected in circuit with inputs of counter line decoder 220. Outputs $C_1$ through $C_{12}$ of counter 210 are connected in predetermined one-to-one circuit relationship with the inputs of address output NAND gates 222-1 through 222-12. Specifically, outputs $C_1$ through $C_3$ are connected in one-to-one relationship to one input of NAND gates 222-9 through 222-11, respectively, outputs $C_4$ through $C_{11}$ are connected in one-to-

TABLE 1

| | | | | Address Counter Outputs | | | | | | | | |
|---|---|---|---|---|---|---|---|---|---|---|---|---|
| $C_{12}$ | $C_{11}$ | $C_{10}$ | $C_9$ | $C_8$ | $C_7$ | $C_6$ | $C_5$ | $C_4$ | $C_3$ | $C_2$ | $C_1$ | $C_0$ |
| | | | | Buffer Addresses | | | | | | | | |
| $A_{12}$ | $A_8$ | $A_7$ | $A_6$ | $A_5$ | $A_4$ | $A_3$ | $A_2$ | $A_1$ | $A_{11}$ | $A_{10}$ | $A_9$ | — |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 1 | 1 |
| 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 1 | 0 | 1 |
| 0 | 0 | 0 | 0 | 0 | 0 | 0 | 0 | 0 | 0 | 1 | 1 | 0 |
| 0 | 0 | 0 | 0 | 0 | 0 | 0 | 0 | 0 | 0 | 1 | 1 | 1 |
| 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 1 | 0 | 0 | 1 |
| 0 | 0 | 0 | 0 | 0 | 0 | 0 | 0 | 0 | 1 | 0 | 1 | 0 |
| 0 | 0 | 0 | 0 | 0 | 0 | 0 | 0 | 0 | 1 | 0 | 1 | 1 |
| 0 | 0 | 0 | 0 | 0 | 0 | 0 | 0 | 0 | 1 | 1 | 0 | 0 |
| 0 | 0 | 0 | 0 | 0 | 0 | 0 | 0 | 0 | 1 | 1 | 0 | 1 |
| 0 | 0 | 0 | 0 | 0 | 0 | 0 | 0 | 0 | 1 | 1 | 1 | 0 |
| 0 | 0 | 0 | 0 | 0 | 0 | 0 | 0 | 0 | 1 | 1 | 1 | 1 |
| 0 | 0 | 0 | 0 | 0 | 0 | 0 | 0 | 1 | 0 | 0 | 0 | 0 |
| ⋮ | ⋮ | ⋮ | ⋮ | ⋮ | ⋮ | ⋮ | ⋮ | ⋮ | ⋮ | ⋮ | ⋮ | ⋮ |
| 0 | 1 | 1 | 1 | 1 | 1 | 1 | 1 | 1 | 1 | 1 | 1 | 1 |
| 1 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 1 | 0 |

From Table I is seen that counter 210 generates a predetermined sequence of signals representative of the buffer storage addresses so that the digital words stored in the buffer storage stages are controllably read out, in accordance with one aspect of the invention, in a prescribed sequence. As indicated in Table I, the readout sequence of the digital words from core memory 12, assuming all eight buffer storages stages include registers which have been loaded is to read out from one of the core segments, for example, the low segment ($A_{12}=0$), the digital words from the first registers, i.e., word locations identified by $A_1$ through $A_8$ being logical $O_5$, in each buffer stage as determined by $A_9$, $A_{10}$, and $A_{11}$ beginning with stage 0 through stage 7 in sequential order. Then, counter 210 generates signals representative of the addresses of the second registers of buffer storage stages 0 through 7 in sequential order and so on through the 256th registers, i.e., word locations, of buffer storage stages 0 through 7 of the low in sequence core buffer segment. In response to the next SYSCLK pulse after the address for the 256th register of buffer stage 7 of the low core segment has been generated, stage $C_{12}$ of counter 210 changes stage to indicate that the digital words are to be read out of registers in the buffer stages of the second core segment, namely, the high segment ($A_{12}=1$). Counter 210 continuously generates, the predetermined sequence of addresses during each of first periodic intervals, i.e., system cycles, described above, and thereby controls system timing for transferring data words from core memory 12 (FIG. 1) to decoders 20 and, hence, the requesting lines.

Counter 210 output $C_{12}$ is also designated the buffer bit (BB) and is supplied to bus control interface 201 one relationship to one input of NAND gates 222-1 through 222-8, respectively, and output $C_{12}$ is connected to one input of NAND gate 222-12. Address output NAND gates 222-13 through 222-17 represent the address of the core segments employed. One input of gates 222-13 through 222-17 is hard wired or otherwise preset to a predetermined bias condition representative of the location of the core buffer segments in core memory 12. The second input of each of gates 222 is supplied with a so-called gate address to bus (GA) signal from bus control interface 201. Signal GA enables gates 222 to supply the current address signals generated in counter 210 via address lines $A_1$ through $A_{17}$ in parallel to bus 17 (FIG. 1) and, hence, the core memory 12 (FIG. 1). Generation of gate address signal GA is discussed below.

Counter line decoder 220 responds to the signals supplied from outputs $C_0$, $C_1$, $C_2$ and $C_3$ of counter 210 to generate signals in sequential order during each of second periodic intervals representative of the buffer storage 0 through 7 of core 12 that counter 210 is currently generating an address for. The output from decoder 220 changes in sequence every other SYSCLK pulse. This is realized by output $C_0$ from counter 210 inhibiting the appearance of signals at the outputs of decoder 220. This sequence is important so that the corresponding one or ones of registers 250 are loaded with data words from the registers in the core buffer stage assigned to the specific one of registers 250. That is, registers 250-0 through 250-7 are assigned in one-to-one relationship to buffer stages 0 through 7 of core memory 12. Inhibiting the outputs of decoder 220 with every other SYSCLK pulse via the $C_0$ output of counter 210 is related to the number N, of lines being serviced, in this example, N=8, and the number of bits in the data word, in this example 16. Additionally, it is important that there is no output from decoder 220 when $C_0$ is in a high or true state. This insures that individual ones of registers 250 are not selected for loading during such intervals. Otherwise, clocking of registers 250 would be in error. Since each of registers 250 must output 16 bits before it can be loaded again and since 8 lines may be loaded in sequential order, it follows that the loading control signal, to be described below, can advance only on every other SYSCLK pulse. This procedure allows 16 bits to be shifted out of each one of registers 250 before the loading control signal is again supplied to them. The sequence of output signals generated at outputs $D_0$ through $D_7$ of decoder 220 in response to outputs $C_0$ through $C_3$ from counter 210 during periodic 16 SYSCLK intervals is shown in Table II.

TABLE II

| Address Counter Outputs | | | | Counter Line Decoder Outputs | | | | | | | |
|---|---|---|---|---|---|---|---|---|---|---|---|
| $C_3$ | $C_2$ | $C_1$ | $C_0$ | $D_7$ | $D_6$ | $D_5$ | $D_4$ | $D_3$ | $D_2$ | $D_1$ | $D_0$ |
| 0 | 0 | 0 | 0 | 0 | 0 | 0 | 0 | 0 | 0 | 0 | 1 |
| 0 | 0 | 0 | 1 | 0 | 0 | 0 | 0 | 0 | 0 | 0 | 0 |
| 0 | 0 | 1 | 0 | 0 | 0 | 0 | 0 | 0 | 0 | 1 | 0 |
| 0 | 0 | 1 | 1 | 0 | 0 | 0 | 0 | 0 | 0 | 0 | 0 |
| 0 | 1 | 0 | 0 | 0 | 0 | 0 | 0 | 0 | 1 | 0 | 0 |
| 0 | 1 | 0 | 1 | 0 | 0 | 0 | 0 | 0 | 0 | 0 | 0 |
| 0 | 1 | 1 | 0 | 0 | 0 | 0 | 0 | 1 | 0 | 0 | 0 |
| 0 | 1 | 1 | 1 | 0 | 0 | 0 | 0 | 0 | 0 | 0 | 0 |
| 1 | 0 | 0 | 0 | 0 | 0 | 0 | 1 | 0 | 0 | 0 | 0 |
| 1 | 0 | 0 | 1 | 0 | 0 | 0 | 0 | 0 | 0 | 0 | 0 |
| 1 | 0 | 1 | 0 | 0 | 0 | 1 | 0 | 0 | 0 | 0 | 0 |
| 1 | 0 | 1 | 1 | 0 | 0 | 0 | 0 | 0 | 0 | 0 | 0 |
| 1 | 1 | 0 | 0 | 0 | 1 | 0 | 0 | 0 | 0 | 0 | 0 |
| 1 | 1 | 0 | 1 | 0 | 0 | 0 | 0 | 0 | 0 | 0 | 0 |
| 1 | 1 | 1 | 0 | 1 | 0 | 0 | 0 | 0 | 0 | 0 | 0 |
| 1 | 1 | 1 | 1 | 0 | 0 | 0 | 0 | 0 | 0 | 0 | 0 |

The sequence of signals shown in Table II is iterated continuously. Thus, multiplexer 16 is continuously generating signals to scan the outputs of store 228, i.e., the signals representative of the buffer stages of core memory 12 which have been loaded. To this end, outputs $D_0$ through $D_7$ of decoder 220 are supplied in one-to-one circuit relationship to a first input of AND gates 230-0 through 230-7. respectively. The output signals from decoder 220, as shown in Table II, are employed to enable the individual ones of gates 230 in a continuous predetermined sequence, namely 230-0 through 230-7 thereby scanning the outputs of store 228 to determine in accordance with the invention, which buffer stages include registers that have been loaded. Anyone of a number of decoder units known in the art may be employed to perform the function of decoder 220. For example, a binary coded decimal (BCD) to decimal decoder of the SN7442A type manufactured by Texas Instruments Incorporated may be used for this purpose.

Address signals are transmitted to and received from bus 17 via address lines $A_1$ through $A_{17}$. Address lines $A_1$ through $A_{17}$ from bus 7 (FIG. 1) are bidirectional lines, i.e., incoming and outgoing, and are connected in circuit (FIG. 2) with address selector 223 and corresponding ones of the outputs of address output gates 222-1 through 222-17. Address lines $A_{12}$ through $A_{17}$ are also connected in circuit with address sampler and comparator 216. Address lines $A_9$, $A_{10}$, and $A_{11}$ are connected in circuit with inputs of bus line decoder and store 224.

Address selector 223 is responsive to predetermined address signals assigned to multiplexer 16 and generates a signal for enabling a plurality of gates in control and status register 225 and for causing register 225 to generate a GO signal. The GO signal enables multiplexer 16 to reset itself for operation by clearing flip-flop 240. This, in turn, enables controlled inhibit 206 to pass the 24 kilohertz signal for generation of the SYSCLK signal. Register 225 includes a plurality of flip-flops (not shown) which store the operational status of multiplexer 16, for example, GO, missed NPR, missed IR and bus time out. The flip-flops of register 225 are loaded via an AND gate (not shown) from write and unit select outputs of address selector 223. The output state of all the flip-flops are gated to predetermined ones of data lines $D_1$ through $D_{16}$ via NAND gates (not shown) which are enabled via an AND (not shown) supplied with a read output and a unit select output from address selector 223. A unit which may be employed for address selector 223 is the M105 address selector unit manufactured by Digital Equipment Corporation and described in the PDP-11 Peripherals Handbook, cited above, beginning at page 7-1.

Address sampler comparator 216 is employed to determine that a dedicated segment of core memory 12 (FIG. 1) is being loaded during the current one-sixth second system cycle and which segment it is, namely high or low. Address lines $A_{12}$ through $A_{17}$ (FIG. 2) are connected in one-to-one circuit relationship to one input of exclusive OR gates 216-1 through 216-6, respectively. Second inputs of gates 216-2 through 216-6 are preset by hardwiring them to predetermined bias conditions representative of the address of the dedicated core segments. A so-called buffer bit (BB) is supplied via inverter 215 to the second input of gate 216-1. The buffer bit represents the core buffer segment, i.e., high or low, which is being loaded in core memory 12 (FIG. 1) and which is to be outputted via multiplexer 16 during the next one-sixth second system cycle. Buffer bit BB is generated by address counter 210 as discussed above. Comparator 216 is operative to generate a high or true output, i.e., an output representative of a logical 1, when signals supplied via address lines $A_{12}$ through $A_{17}$ compare to the preset inputs plus the buffer bit. The output from comparator 216 is supplied to one input of NAND gate 226. Comparator 216 generates a desired high output only when all of the outputs of gates 216-1 through 216-6 go high. This is achieved by employing so-called open collector type gates. One such comparator arrangement may use the SN7486 type exclusive OR gates manufactured by Texas Instruments Corporation. Any one of the numerous comparator arrangements known in the art may equally be employed for this purpose.

Bus line decoder and store 224 is employed to determine the one or ones of the buffer storage stages in the core segment in which registers being loaded are with digital words identified by comparator 216 and to store signals representative of the buffer stages including registers that have been loaded. To this end, incoming address lines $A_9$, $A_{10}$ and $A_{11}$ are connected in one-to-one circuit relationship to predetermined inputs of decoder and store 224. The output from comparator 216 is supplied via NAND gate 226 to enable decoder and store 224. That is, decoder and store 224 responds to a low or false output from gate 226 to decode the current address bits being supplied via lines $A_9$, $A_{10}$ and $A_{11}$. NAND gate 226, in turn, is enabled by a so-called master sync (MS) signal supplied from bus control interface 201. Generation of the master sync signal is described in detail in the PDP-11 Peripherals Handbook, cited above, beginning on page 5–6 at paragraph 5.5 entitled Data Transfer. Specifically, master sync pulse generation is accomplished upon a transfer of each of the 16 bit digital words from the disk memory of mass storage unit 11 (FIG. 1) to a buffer stage of core memory 12. Consequently, decoder and store 224 (FIG. 2) is enabled during intervals that the output from NAND gate 226 goes low, i.e., during intervals that the output from comparator 216 is true and that the master sync signal is true.

During each one-sixth second system cycle decoder and store 224 decodes incoming groups of address bits $A_9$, $A_{10}$ and $A_{11}$ and stores a signal representative of the decoded addresses. If all the buffer stages have registers which were loaded, the outputs of decoder store 224 would all be true, i.e., representation of a logical 1. If none of the buffer stages have registers which were loaded, the outputs of decoder store 224 would be false, i.e., representative of a logical 0. In any event, the buffer stages which have loaded registers are indicated by a true signal at the output of the decoder store 224 which corresponds to the particular buffer stages. Outputs $S_0'$ through $S_7'$ correspond to buffer stages 0 through 7, respectively. Decoder and store 224 is cleared by a signal supplied via delay 227, upon termination of the current periodic interval, i.e., system cycle after the stored signals have been transferred, i.e., clocked into bus line store 228. An addressable latch circuit arrangement which may be employed, in well-known fashion, for decoder and store 224, is the 9334 type 8 bit addressable store manufactured by Fairchild Semiconductor.

Bus line store 228 is employed to store the signals representing the buffer stages which have been loaded during the last past system cycle, namely $S_0$ through $S_7$, for the purpose of effecting the transfer of the digital code words from registers in those buffer stages to registers 250 in sequential order during the current periodic interval, i.e., system cycle.

Figure 4:
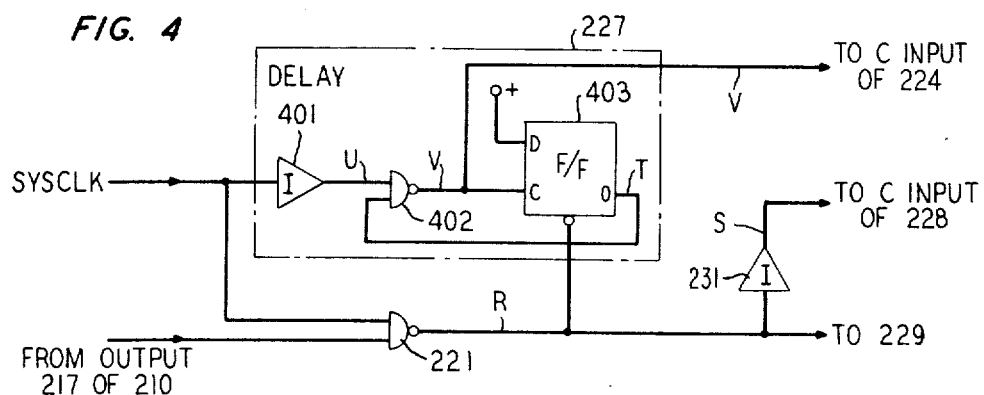
FIG. 4 shows details of delay 227 of FIG. 2 and its relationship to associated circuit elements.
Figure 5:
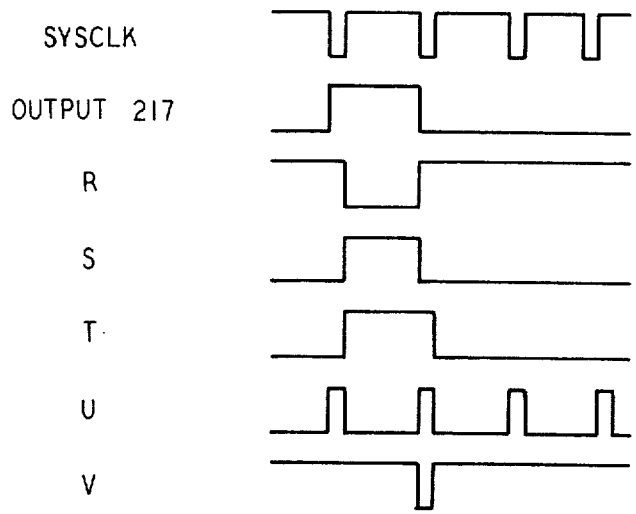
FIG. 5 depicts a sequence of waveforms useful in describing the operation of delay 227 and related functions.

It is important that the information from decoder 224 be transferred into store 228 before decoder 224 is cleared to initiate decoding of the addresses of the buffer stages being loaded during the next system cycle. This transfer is achieved by employing the carry signal generated at output 217 of counter 210 to enable NAND gate 221 for clocking the information to store 228 and for enabling delay 227 to activate a fixed delay so that decoder 224 is cleared after clocking of store 228 is accomplished. Simply stated, carry signal output 217 of counter 210 enables NAND gate 221 to supply the next SYSCLK pulse to enable delay 227, clock data into store 228 and to set flip-flop 229 for initiating generating an interrupt request (IR) in bus control interface 201. Details of delay 227 and generation of the signals used to clock decoder 224, store 228 and flip-flop 229 are shown in FIGS. 4 and 5 described below. The interrupt request informs processor 10 that additional code words, if any, may be supplied to the unloaded core segment which are to be outputted during the next system cycle. Bus line store 228 may be any one of numerous devices known in the art capable of storing logical signals. For example, two quad latches of the SN74175N type manufactured by Texas Instruments Corporation may be employed in well-known fashion.

Briefly, FIG. 4 shows details of delay 227 and its relationship to NAND gate 221, inverter 231 and flip-flop 229. FIG. 5 illustrates a sequence of waveforms useful in describing operation of the circuit of FIG. 4. The waveforms have been labelled to correspond to the circuit points indicated in FIG. 4. Delay 227 includes inverter 401, NAND gate 402 and D-type flip-flop 403 connected in circuit as shown in FIG. 4. The SYSCLK signal, as shown in FIG. 5, from timing control unit 202 (FIG. 2) is supplied to inverter 401 and one input of NAND gate 221. Inverter 401 responds to the SYSCLK signal to generate a signal as indicated in waveform U of FIG. 5 which is supplied to one input of NAND gate 402. The output of gate 402 is supplied to clock input C of flip-flop 403 and to the clear input of the decoder 224. The O output of flip-flop 403 is supplied to a second input of NAND gate 402. Output 217 from counter 210 (FIG. 2) is supplied to a second input of NAND gate 221. The output from gate 221 is supplied to the clear input of flip flop 403, to inverter 231 and to the toggle input of flip-flop 229 (FIG. 2). The output of inverter 231 is supplied to the clock input of stores 228 (FIG. 2).

Operation of the arrangement shown in FIG. 4 is straightfoward. In response to SYSCLK, inverter 401 generates a signal as indicated in waveform U of FIG. 5. NAND gate 221 is normally disabled and responds to SYSCLK and output 217 from counter 210 as shown in FIG. 5 to generate a signal as shown in waveform R of FIG. 5. Inverter 231 responds to the output from gate 221 to generate a signal as shown in waveform S of FIG. 5. Store 228 (FIG. 2) responds to the leading edge of the output from inverter 231 to clock in and store the outputs from decoder 224 (FIG. 2). Flip-flop 403 is cleared by the output from gate 221 causing output 0 to go high as shown in waveform T of FIG. 5. The high output from flip-flop 403 enables NAND gate 402 which, in turn, responds to the output from inverter 401 to generate a pulse as shown in waveform V of FIG. 5. The output from gate 402, as shown in waveform V of FIG. 5, is supplied to clear decoder 224 (FIG. 2). Thus, the outputs from decoder 224 are clocked into bus line store 228 by the leading edge of the signal shown in waveform S of FIG. 5 and decoder 224 is cleared by the signal shown in waveform V of FIG. 5. Consequently, the data outputs of decoder 224 are transferred into store 228 prior to clearing decoder 224 as desired.

Returning now to FIG. 2, outputs $S_0$ through $S_7$ of bus line store 228 are connected in one-to-one circuit relationship with second inputs of AND gates 230-0 through 230-7, respectively. As stated above, outputs $D_0$ through $D_7$ of counter line decoder 220 are connected in one-to-one circuit relationship with first inputs of AND gates 230-0 and 230-7, respectively. Outputs from AND gates 230-0 through 230-7 are connected in one-to-one circuit relationship with first inputs of AND gates 233-0 through 233-7, respectively, and are connected to inputs of OR gate 234. Second inputs of AND gates 234 are supplied with a so-called data strobe (DS) signal from bus control interface 201. The outputs from AND gates 233-0 through 233-7 are connected in one-to-one circuit relationship with the load control inputs of shift registers 250-0 through 250-7, respectively. SYSCLK pulse signals are supplied to the shift clock inputs of registers 250 while a so-called silence code signal is supplied to the serial data inputs of registers 250. The silence code is merely a signal having alternate 1's and 0's. Generation of the silence code is realized by supplying the SYSCLK signal to toggle flip-flop 235 in well known fashion. Th alternate 1-0 output from flip-flop 235 is loaded into each of registers 250 when the data words are being shifted out and when no data words have been loaded. Anyone of numerous shift registers may be employed for each of registers 250, for example, two SN74165 type 8 bit registers connected in tandem.

The outputs from AND gates 230-0 through 230-7 indicate sequentially which ones of buffer stages 0 through 7 of core memory 12 include registers that have been loaded with data words to be transferred to corresponding ones of registers 250 during the current one-sixth second system cycle. That is to say, the buffer stages of core 12 which have been loaded as indicated by outputs $S_0$ through $S_7$ of store 228 are scanned by employing gates 230-0 through 230-7 and the outputs of decoder 220. Consequently, AND gates 233-0 through 233-7 are enabled sequentially to load the corresponding data words to be supplied via data lines $D_0$ through $D_{15}$ from bus 17 to the appropriate ones of registers 250-0 through 250-7. Gates 233 are enabled by a so-called data strobe signal at an appropriate instant to load the data words from data lines $D_0$ through $D_{15}$ into the appropriate one of registers 250. The time relationship of the data strobe signal is discussed below in conjunction with the sequence of waveforms shown in FIG. 8.

The output from OR gate 234 indicates that a data word is needed from the core buffer stage and register, i.e., digital word location that is identified by the address signals currently being generated by address counter 210 and available at the inputs of address output gates 222. The current address is supplied to core memory 12 at an appropriate instant, once multiplexer 16 has gained the so-called bus mastership by supplying a so-called gate address to bus signal (GA) from interface 201 to enable gates 222.

The output from OR gate 234 is employed to initiate a so-called nonprocessor request (NPR) to gain mastership of bus 17 and cause core memory 12 to become a slave unit.

Figure 6:
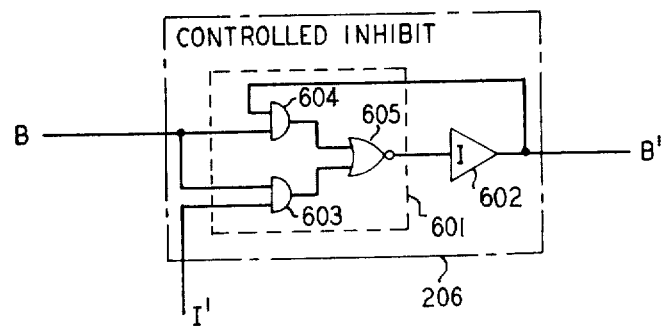
FIG. 6 shows details of the controlled inhibit of FIG. 2.
Figure 7:
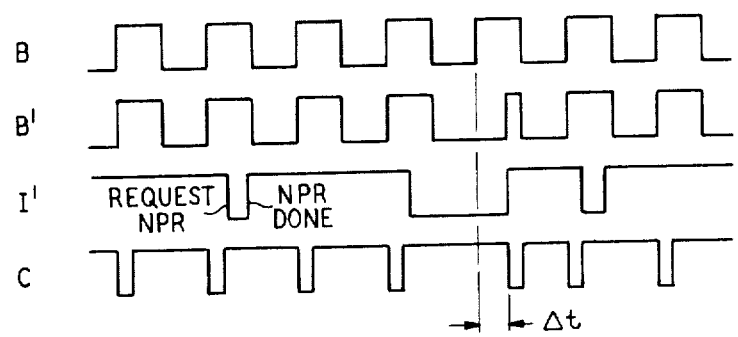
FIG. 7 depicts a sequence of waveforms useful in describing the operation of the controlled inhibit shown in FIG. 6.

Prior to describing the circuit details and sequence of events relating to the generation of an NPR and to the transfer of data words from core 12 (FIG. 1) via parallel data lines $D_0$ through $D_{15}$ to registers 250, it is felt that details and operation of controlled inhibit 206 should be explained. FIG. 6 shows the circuit details of controlled inhibit 206. FIG. 7 shows a sequence of waveforms useful in describing operation of inhibit 206. The waveforms of FIG. 7 have been labelled to correspond to the circuit points indicated in FIG. 6. Waveform C is the SYSCLK signal. Controlled inhibit 206 is employed to inhibit, if necessary, generation of a SYSCLK pulse until transfer of a requested data word from core memory 12 to one of registers 250 has been completed or until the NPR cycle has been aborted. SYSCLK pulse generation is inhibited so that address counter 210 (FIG. 2) is not incremented and registers 250 are not clocked, either until the requested data word has been loaded or the NPR request has been aborted. This inhibiting of the SYSCLK pulse minimizes system errors and insures that the data words are supplied to the appropriate ones of registers 250.

Controlled inhibit 206 performs the inhibit function and includes AND-OR-INVERT gate 601 and inverter 602 connected as shown in FIG. 6. A signal as shown in waveform B is supplied to one input of each of AND gates 603 and 604 of gate 601. A signal as shown in waveform B' is generated at the output of inverter 602 and is supplied to a second input of AND gate 604. A signal as shown in waveform I' of FIG. 6 is supplied to a second input of AND gate 603. Waveform I' of FIG. 7 depicts the NPR cycle. The high-to-low transition represents an NPR while the low-to-high transition represents that the request is complete. Thus, so long as the request for NPR is completed prior to the normal generation of a SYSCLK pulse as shown in waveform C of FIG. 6, inhibit 206 does not delay the SYSCLK pulses. However, when the request for NPR is not completed prior to the instant that a SYSCLK pulse would normally be generated, generation of the SYSCLK pulse is delayed until the NPR request is completed, as indicated in waveforms B', I' and C of FIG. 6. This delay in generation of the next SYSCLK pulse insures that the requested data word is supplied to the proper requesting line and allows for some flexibility in the time required to supply the data words to the requesting lines. Consequently, desired system characteristics are realized without resorting to complex and expensive buffer arrangements.

Figure 8:
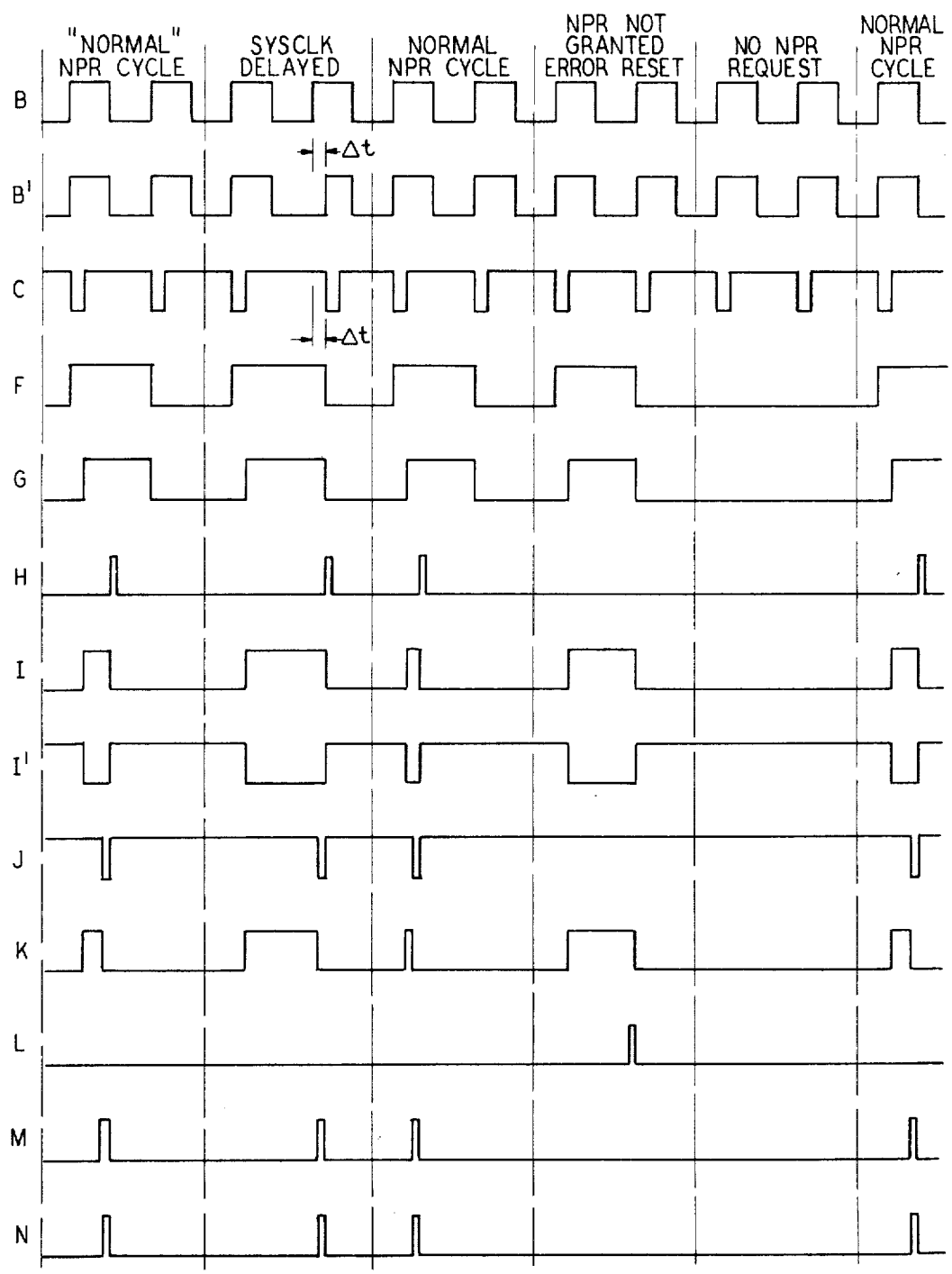
FIG. 8 shows a sequence of waveforms useful in describing the operation of the multiplexer shown in FIG. 2.

Returning again to FIG. 2, as stated above, the output of OR gate 234 initiates an NPR request and is representative that a data word is required from the buffer stage and word location in that stage of core 12 identified by the address currently generated counter 210 and supplied to output address gates 222. FIG. 8 shows a sequence of waveforms useful in describing operation of multiplexer 16 in requesting and obtaining data words from core memory 12. The waveforms of FIG. 8 have been labelled to correspond to circuit points indicated in FIG. 2, and illustrates several possible sequences of events relating to request for NPR's and the resultant system operations, namely, a normal NPR cycle, NPR cycle in which generation of a SYSCLK pulse is delayed, an NPR not being granted thereby causing an abort of the NPR request and no NPR request.

Prior to a detailed discussion of the ramifications of the several possible NPR cycle conditions, it is useful to discuss the control signals generated by interface 201 in response and relating to an NPR. Specifically, in the process of multiplexer 16 obtaining mastership of bus 17 in response to an NPR, as described in PDP-11 Peripherals Handbook cited above, a so-called master A (MA) signal is generated in the M7821 interrupt control module (not shown) of interface 201. This master A signal initiates the generation of bus control signals in the M796 master control module (not shown)

of interface 201. In response to a true master A signal the master control module generates a sequence of control signals including gate address to bus (GA), master sync wait (not shown), master sync (MS), data wait (not shown), data strobe (DS) and end cycle (EC), in that order. During intervals that the master A signal is not generated a high state No master A (NMA) is generated by interface 201. Upon generating the master sync signal, the master control module of interface 201 must first receive a so-called slave sync signal from the desired slave unit, in this example, core memory 12, prior to generating the data wait, data strobe and end cycle control signals. These control functions and generation of the various control signals are described in detail in the PDP-11 Peripherals Handbook, cited above beginning at page 7-1. Additionally, the relative timing of control signals generated in the M796 master control module for outgoing data signals and incoming data signals is further illustrated in FIGS. 6–19 and 6–20, respectively, of the PDP-11 Peripherals Handbook.

Returning to FIG. 2 and FIG. 8 a normal NPR cycle is one in which a SYSCLK pulse need not be delayed. That is to say, an NPR is made, granted and done after generation of a first SYSCLK pulse and prior to generation of the next SYSCLK pulse. Waveform F of FIG. 8 shows the output of OR gate 234. As indicated, the signal depicted in waveform F goes high in response to a SYSCLK pulse as shown in waveform C of FIG. 8, and remains high until the next SYSCLK pulse. The output of OR gate 234 is supplied to one input of AND gate 236. The SYSCLK signal is supplied to a second input of AND gate 236. AND gate 236 responds to the supplied signals to generate a pulsating signal as shown in waveform G. The relationship of the leading edge of the pulse signal shown in waveform G to the SYSCLK pulses is important so that an NPR is not initiated while address counter 210 is being incremented. The output of gate 236 is supplied to the clock input of D type flip-flop 240. Flip-flop 240 responds, in well known fashion, to the output from gate 236 to generate a high state signal at its 1 output as shown in waveform I. The signal generated at the 1 output of flip-flop 240 is the NPR request signal and is supplied to bus control interface 201, one input of AND gate 242 and via inverter 243 (waveform I' FIG. 8) to controlled inhibit 206. Interface 201 communicates the NPR request to processor 10 via bus 17 and awaits a response. Prior to the request being granted no master A (NMA) signal is present and, consequently, a high state signal is normally supplied to a second input of AND gate 242 (waveform J, FIG. 8). Since output 1 of flip-flop 240 is high and no master A (NMA) is high, the output from AND gate 242 goes high, as indicated in waveform K of FIG. 8. The output from AND gate 242 alone does not trigger error reset one-shot 205 for reasons to be discussed below. Thus, the 1 output of flip-flop 240 remains in a high state until an end cycle (EC) signal, as shown in waveform H of FIG. 8, is supplied from interface 201 via NOR gate 241 to the clear input of D type flip-flop 240. However, prior to generation of the end cycle signal a master A signal is received as indicated by NMA of waveform J going from a normally high state to a low state. The master A signal causes generation of a number of control signals in rapid succession as noted above. Thus, once master A is generated address output gates 222 are all enabled by the gate address (GA) signal from interface 201, as shown in waveform M of FIG. 8. Thereafter, gates 233 are enabled via a data strobe signal (DS) from interface 201, as shown in waveform N of FIG. 8, so that an appropriate one of registers 250 is loaded with the data word corresponding to the core address which was outputted by gates 222. In a normal one-sixth second system cycle none, one or more than one of the output lines may be supplied with data words. In such event each of registers 250-0 through 250-7 corresponding to a requesting line would be loaded with a data word in sequence via an NPR cycle as described.

Assuming that the next buffer stage of core 12 has been loaded as indicated by a high state output from an associated one of AND gates 230 and, hence, OR gate 234, causing another NPR cycle to be initiated as indicated by the waveforms of FIG. 8. During this next cycle it is assumed that the NPR cycle is not completed prior to the next subsequent SYSCLK pulse being generated. Consequently, generation of the next SYSCLK pulse is delayed by an interval $\Delta t$, until the NPR cycle is completed as indicated by the end of cycle pulse of waveform H of FIG. 8. Except for the delay introduced via controlled inhibit 206 (FIG. 2), all control signals are generated in the same sequence as for the normal NPR cycle as described above.

The next NPR cycle shown in FIG. 8 is a normal cycle as discussed above.

In the next NPR cycle it is assumed that a data word is required as indicated by the output of OR gate 234 (waveform FIG. 8) but that the NPR request for some reason was not granted in a predetermined time interval. In such an event, no master A signal is generated and the no master A (NMA) input to AND gate 242, as shown in waveform J of FIG. 8, remains in a high state. Consequently, error reset one-shot 205 responds to the NMA signal and the next 0 to 1 state transition of the output from clock 203, as shown in waveform B of FIG. 8, to generate a narrow pulse signal as shown in waveform L of FIG. 8.

The pulse output from error one-shot 205 (FIG. 1) is supplied via NOR gate 241 to the clear input of flip-flop 240. Flip-flop 240 is cleared, thereby causing a low state at its 1 output as shown in waveform I of FIG. 8. Since the NPR was not granted, no master A signal (NMA) was generated and, consequently no gate address (GA), data strobe (DS) and end cycle (EC) signals were generated. Because the NPR was not granted and the requested cycle was aborted via error reset 205, no data word was transferred to the one of registers 250 corresponding to the loaded buffer stage and the requesting line. That particular data word is lost and a silence code is outputted from the particular one of registers 250 assigned to the buffer stage corresponding to the aborted NPR.

During the next scanning interval it is assumed that the buffer stage in core memory 12 as identified by the address generated by counter 210 has not been loaded. Therefore, no NPR has been requested.

In the next scanning cycle registers in the next buffer stage have been loaded and a normal NPR cycle is effected as indicated by the waveform of FIG. 8.

Thus, it is seen that multiplexer 16 operates to monitor, in accordance with one aspect of the invention, the addresses transmitted on bus 17 during transfer of data words from the disk memory to the core memory for determining the core buffer stages that include registers that have been loaded with data words to be read to requesting lines. Once it is determined that buffer stages have been loaded, multiplexer 16 effects reading the registers of the buffer stages in a prescribed sequential order in which the first data word from the first register of each of the loaded buffer stages is outputted in sequential order beginning with the first loaded buffer storage stage through the last loaded buffer storage stage in the sequential arrangement during each scanning cycle until all the words from registers in each loaded buffer stage have been read out. In the event that a buffer stage has not been loaded, the corresponding one of registers 250 outputs a silence code. A silence code signal is continuously supplied to all of registers 250 via flip-flop 235 as described above.

Figure 9:
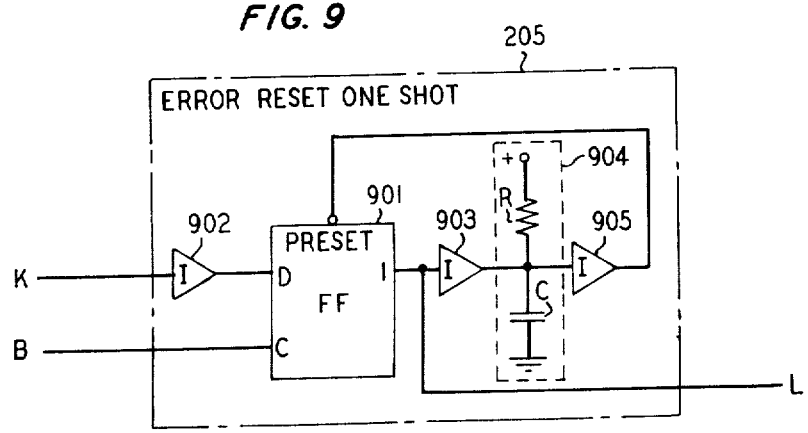
FIG. 9 depicts details of the error reset one-shot used in the multiplexer shown in FIGS. 2A, 2B and 2C.

FIG. 9 depicts details of error reset one-shot 205. Shown is D type flip-flop 901. The output from AND gate 242 (FIG. 2), as represented by K is supplied via inverter 902 to data input D of flip-flop 901. The output from clock 203 as represented by B is supplied to clock input C of flip-flop 901. The 1 output of flip-flop 901 is supplied to inverter 903 and is outputted as indicated by L. Inverter 903 is connected in circuit with RC timing circuit 904 and with the input of inverter 905. In turn, the output of inverter 905 is connected in circuit with the preset input of flip-flop 901.

Operation of one-shot 205 is straightforward. Because of the circuit arrangement, as shown in FIG. 9, the 1 output of flip-flop 901 is normally in a high state. Then, the 1 output of flip-flop 901 assumes the state of signals supplied to the D input upon the leading edge of a 0 to 1, i.e., low to high state, transition of the signal supplied to the C input of flip-flop 901. Thus, if the signal supplied to the D input is low, the 1 output of flip-flop 901 goes low on the next low to high change of state at the C input and if the signal supplied to the D input is high, the 1 output remains high. Initially, the 1 output of flip-flop 901 is high and, consequently, the output of inverter 903 is low. Thus, capacitor C is essentially short circuited. Now, assuming a low input to input D, the 1 output of flip-flop 901 goes low in response to the next low-high transition at input C. The low output from flip-flop 901 causes the output of inverter 903 to go high or effectively to become open-circuited. This open circuit is realized by employing an open collector output type inverter gate. In turn, capacitor C charges at a predetermined rate through resistor R. When the charge across capacitor C exceeds a predetermined threshold potential, the output of inverter 905 changes state. This change of state from inverter 905 presets flip-flop 901 to its initial condition of the 1 output being high. The time constant of timing circuit 904 is selected to be of relatively short duration to insure a rapid abort of the NPR.

Operation of the instant response system is controlled via signals generated in multiplexer 16 to operate on a so-called system cycle basis. The system cycle interval may be set at any desired time interval, in this example, as indicated above a one-sixth second cycle is being used. The choice of a one-sixth second interval is somewhat arbitrary and corresponds approximately to a speech segment. Thus, the instant system continuously cycles through intervals of one-sixth second duration in responding to random incoming requests. For example, beginning during, a system cycle, processor 10 (FIG. 1) in conjunction with programs stored in core memory 12, in well known fashion, determines that a request or requests have been made by one or more subscribers at one or more of station sets 23. Then, processor 10 in conjunction with specific applications programs, not relevant to the instant invention, determines which message segments stored in the disk memory of mass storage unit 11 are required to concatenate the response or responses. That is to say, in the current system cycle, processor 10 in conjunction with programs in core 12 determines what responses are to be made. During the next one-sixth second system cycle processor 10 instructs the disk memory to read blocks of 256 data words each, representative of desired message segments to buffer stages in core memory 12 corresponding to the requesting lines. The core buffer stages have sequential addresses and are located in a designated section of core memory 12. The disk memory assumes mastership of bus 17 in well known fashion, and transfers the desired data words to registers in the dedicated core buffer stages. To effect this transfer, the address of the core buffer stage must accompany each data word being transferred. Multiplexer 16 monitors the core buffer addresses, in accordance with the invention, and registers that the disk has loaded data words into registers in certain ones of the dedicated buffer stages of core 12. Thus, multiplexer 16 registers that it must read the data words from the loaded buffer stages of core 12 on the next system cycle. At the end of the current system cycle, multiplexer 16 generates an interrupt signal which interrupts processor 10 to indicate that the system cycle has been completed. During the next system cycle, multpilexer 16 then unloads in prescribed sequential order each 16-bit word in parallel form from the registers of the loaded buffer stages into output shift registers 250 (FIG. 2). The data words are then supplied in serial form to corresponding ones of decoders 20 (FIG. 1) assigned to the requesting lines. This process is repeated until the 256 data words in each of the loaded core buffer stages has been outputted and the one-sixth second system cycle has terminated. While multiplexer 16 was reading the registers of the core buffer stages in the first core segment to decoders 20, processor 10 has instructed the disk memory to load the next blocks of 256 data words each to be outputted to registers in buffer stages located in a second core segment. The stages to be loaded may correspond to the previous requesting lines or any additional requesting lines. Multiplexer 16 again monitors the addresses of buffer storage stages in core memory 12 to determine which buffer stages include registers that have been loaded and effects reading the data words from the loaded buffer stages as described above. During intervals representative of pauses in the speech process or no signal to be outputted, multiplexer 16 generates a silence code signal which is supplied to decoders 20. The above process is iterated on the one-sixth second system cycle until all messages to requesting lines are completed. Then multiplexer 16 reverts to an idle state in which it continuously cycles through the core buffer addresses to generate system timing and, continuously, supplies a silence code to all of decoders 20.

It is felt important again to note the readout pattern of core buffer storage stages 0 through 7 (FIG. 13) generated by multiplexer 16. Consider an example in which requests or inquiries have been made on lines 0, 1, 3 and 5. Thus, lines 2, 4, 6 and 7 remain silent. Consequently, only buffer stages assigned to lines 0, 1, 3 and 5 are loaded with blocks of 256 words each. Multiplexer 16 monitors addresses of the data words read from the disk 7 memory to core memory 12 and registers that buffer stages 0, 1, 3 and 5, which correspond to the requesting lines, have registers that have been loaded. On the next system cycle, multiplexer 16 initiates and controls reading the data words from the loaded buffer stages in a prescribed sequence into corresponding ones of registers 250 (FIG. 2). Thus, the first data words from the loaded buffer storage stages are read to associated ones of registers 250 in a prescribed sequence, for example, the first word from the first register buffer stage 0 into register 250-0, then first word from the first register of buffer stage 1 into register 250-1, silence code to register 250-2, first word from buffer stage 3 into register 250-3, silence code to register 250-4, first word from buffer stage 5 into register 250-5, silence code to registers 250-6 and 250-7. This prescribed sequence is iterated until all 256 registers in each of the loaded buffer storage stages have been read out. This so-called skimming of data words from each loaded buffer stage is sequence during each 16 bit cycle, i.e., a register from a buffer stage is read every other SYSCLK pulse, is iterated until all 256 data words have been read into and, subsequently, outputted from the appropriate ones of registers 250. During the current system cycle processor 10 has loaded buffer stages in a second core segment with blocks of data words representative of desired responses. The buffer stages which have been loaded may correspond to the same requesting lines as those in the prior system cycle and any new requesting lines. Again buffer stages have not been loaded which correspond to lines on which no requests have been made and those for which requests have been terminated. Upon multiplexer 16 detecting that registers in buffer stages in the second core segment have been loaded, it again effects reading out the data words as described above.

Figure 10:
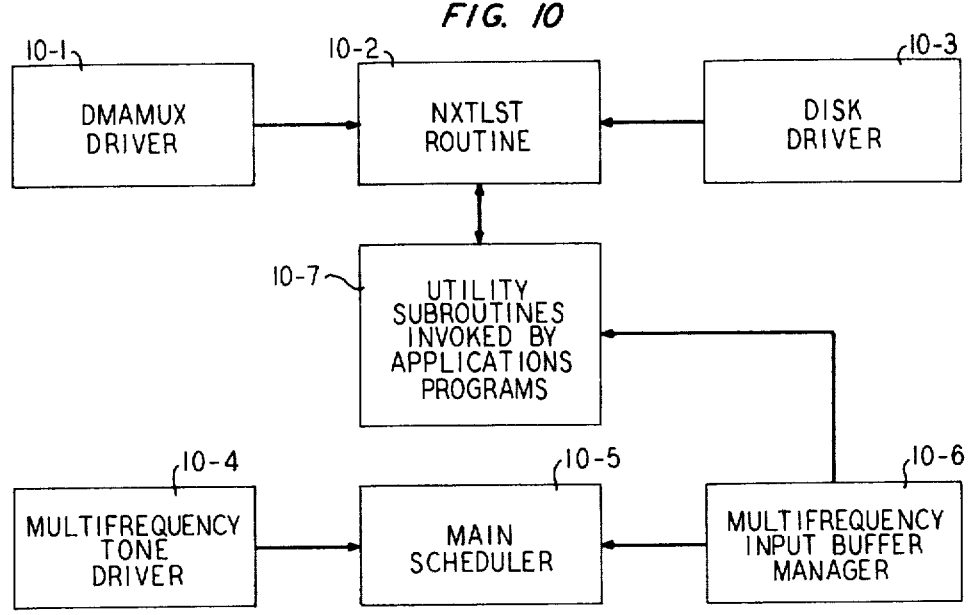
FIG. 10 illustrates in block diagram form the relationship between software routines useful in describing operation of the response system.

A software arrangement which may be employed in the instant response system is outlined as shown in block diagram form in FIG. 10. Source listings of certain ones of the program routines are included in the Appendix attached thereto, namely, DMAMUX driver 10-1, NXTLST routine 10-2, disk driver 10-3, multifrequency tone driver 10-4, main scheduler 10-5 and multifrequency input buffer manager 10-6. The utility subroutines 10-7 relate to applications programs used mostly for concatenating stored message segments into responses to incoming coded requests. Applications programs which may be employed in the instant response system are straightforward and well within the ability of those routinely familiar with computer programming art to write for specific applications as desired. The source program listings in the Appendix are written in the PDP-11/10 machine language and are readily convertible into binary form for use with processor 10 and core 12, i.e., the PDP-11/10 system, by employing an assembler program commercially available from Digital Equipment Corporation. Programming of the PDP-11/10 processor is described in detail in PDP-11/05/10/35/40 Processor Handbook and in PDP-11 Peripherals Handbook, both cited above.

In operation, multifrequency tone driver routine 10-4 is employed to handle incoming requests from subscribers at one or more of station sets 23 (FIG. 1). It determines the type of request, e.g., command or data input, which requires predetermined action by the response system. Once multifrequency tone driver 10-4 has determined some system action is required, main scheduler routine 10-5 is invoked. Main scheduler 10-5 operates to switch control of the response system among predetermined tasks to be performed dependent on the subscribers utilizing the instant response system. In this example, scheduler routine 10-5 is the so-called "Round-Robin" type well known in the art. In turn, main scheduler 10-5 transfers control of the system to multifrequency buffer manager routine 10-6.

Multifrequency buffer manager routine 10-6 includes a number of subroutines employed to prepare in appropriate formats any messages so that they may be outputted via NXTLST routine 10-2 described below.

Utility subroutines 10-7 to be employed are dependent on the particular functions to be performed by the response system for example, stop, repeat voiced output, return status of particular line, et cetera. Typically, they are routine and straightforward. Those possessing ordinary still in the programming art may write them as desired.

The remaining routines, namely DMAMUX driver 901, NXTLST routine 10-2 and disk driver 10-3 are employed to operate computer system 25 to interact with multiplexer 16 in responding to incoming requests. For purposes of discussion, it is assumed that the response system is in a so-called idle state. Let us define the idle state as one attained upon the following events taking place: the response system has been initialized, i.e., an incoming request has been made, multiplexer 16 has been activated and program control has been transferred to main scheduler 10-5.

Subsequent to the establishment of the idle state, all events relating to initiation and continuance of simultaneous conversations between the response system and a plurality of subscribers are controlled by the timing signals generated in multiplexer 16 as discussed above. Timing control of computer system 25 to effect the desired system cycles is effected by interrupts generated by multiplexer 16. These interrupts are handled by DMAMUX driver routine 10-3. A source listing of a DMAMUX driver routine which may be used in practicing the invention is set out in the Appendix. Upon execution, DMAMUX driver 10-3, supplies NXTLST routine 10-2 (described below) with information identifying the core buffer stage segment currently being monitored by multiplexer 16. This informs NXTLST 10-2 which core buffer segment it must load with data words, if any, during the current system cycle. After the appropriate sequence of program steps of DMAMUX driver 10-3 as set out in the Appendix, has been completed, control is transferred to NXTLST 10-2.

FIG. 11 depicts a flowchart useful in describing the sequence of events of the NXTLST routine. A source program listing of the NXTLST routine written in PDP-11/10 machine language is set out in the Appendix.

Figure 12:
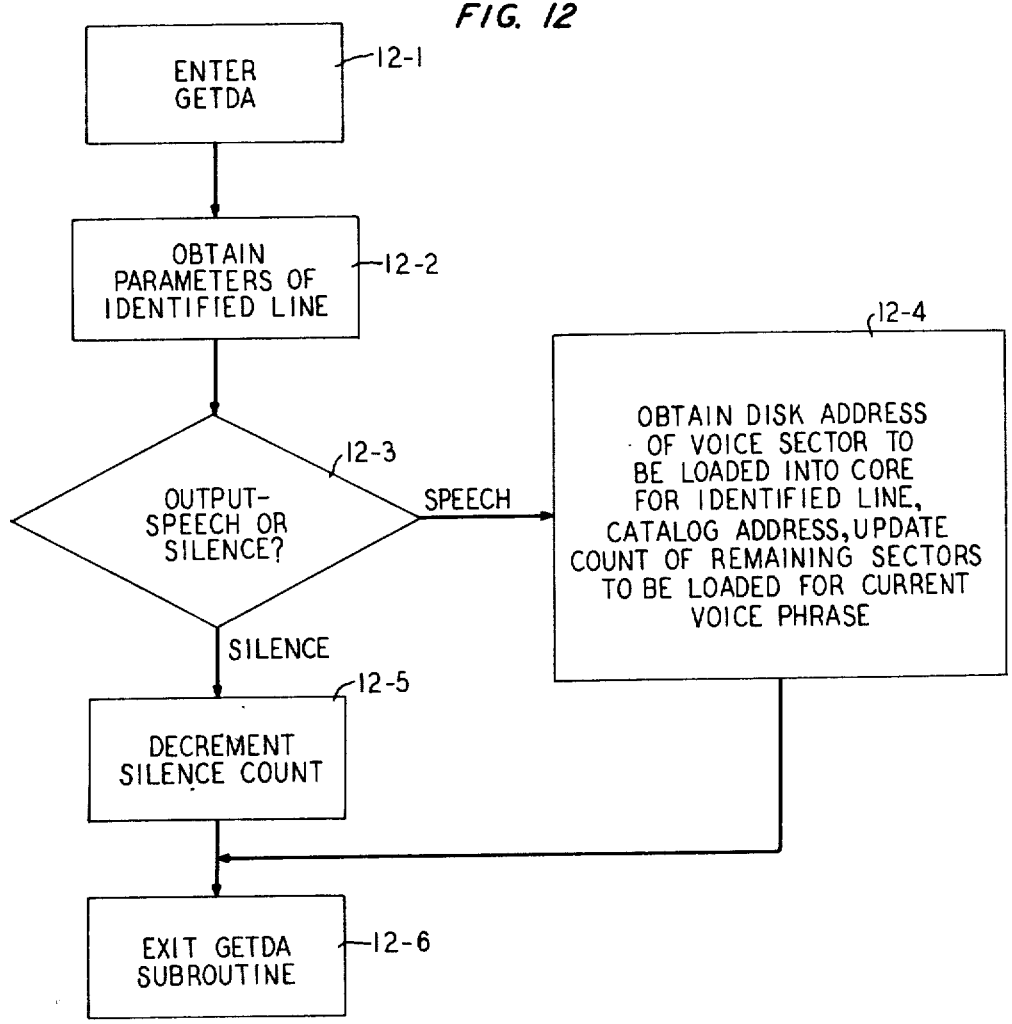
FIG. 12 shows in simplified form a flow chart useful in describing the GETDA subroutine used in the NXTLST routine.

However, prior to launching on a detailed description of FIG. 11, it is felt useful to describe the GETDA subroutine used in the NXTLST routine. FIG. 12 shows a flowchart useful in describing the sequence of steps of the GETDA subroutine. A source program listing of the GETDA subroutine written in PDP-11/10 machine language is included in the NXTLST routine set out in the Appendex. GETDA stands for get the disk addresses. The flowchart of FIG. 12 is seen to include two different symbols. The rectangular symbols are commonly referred to as operational blocks and contain the description or descriptions of a particular operational step or steps. The diamond shaped symbols are commonly referred to as conditional branch points and contain a description of a test performed by the computer system for enabling it to choose the next step to be performed.

As shown in the flowchart of FIG. 12 the GETDA subroutine is entered via operational block 12-1.

Operational block 12-2 indicates that computer system 25 is to obtain the parameters of a line identified by the NXTLST routine as being active. That is, the NXTLST routine will inform GETDA as to the identity of the particular line or lines currently being serviced.

Then, control is transferred to conditional branch point 12-3 which determines whether to output speech or silence. If speech is to be outputted control is transferred to operational block 12-4.

Operational block 12-4 causes computer 25 to obtain the disk address of the voice sector, i.e., 256 data word block, to be loaded into a core buffer stage assigned to the identified line, catalog the disk addresses and updates the count of remaining voice sectors to be loaded into the core buffer for the currently generated voice phrase. Thereafter, operational block 12-4 transfers control to operational block 12-6 to exit the GETDA subroutine and return to the NXTLST routine.

Returning to conditional branch point 12-3, had a silence output been called for, control would have been transferred to operational block 12-5. Silence is required in generation of desired speech phrases, for example, twenty two. It is readily seen that a pause must be inserted between twenty and two. Operational block 12-5 inserts the desired pause by indicating that silence is required. Block 12-5 also keeps account of the silence intervals generated by decrementing the silence count. Thereafter, control is transferred to operational block 12-6 to exit the GETDA subroutine and return to the NXTLST routine.

Returning now to FIG. 11, there is shown a flowchart illustrating the steps of the NXTLST routine. The NXTLST routine determines which requesting lines, i.e., conversations, must be attended by the instant response system during the current system cycle. Thus, the NXTLST routine is entered via operational block 11-1 which enters the DMAMUX driver by an interrupt signal generated in multiplexer 16 (FIG. 2) at one-sixth second intervals. The DMAMUX driver routine is included in the Appendix.

Operational block 11-2 obtains and registers from multiplexer 16 the address of the core region currently being monitored by multiplexer 16 (DMAMUX). This information is required so that processor 10 (FIG. 1) can inform the disk memory of mass storage 11 in which core segment the buffer stages are to be loaded. Control is then transferred to conditional branch point 11-3.

Conditional branch point 11-3 performs an evaluation of whether line 0 is active. If line 0 is not active, control is transferred directly to conditional branch point 11-5. If line 0 is active, control is transferred to operational block 11-4.

Operational block 11-4 calls-up the GETDA subroutine described above and catalogs the disk sector to be outputted. Thereafter, control is transferred to conditional branch point 11-5.

Conditional branch point 11-5 performs an evaluation to determine whether line 1 is active. If line 1 is active, control is transferred to operational block 11-6 and the GETDA subroutine is again called-up. The disk sector to be supplied to line 1 is cataloged and control is transferred to the next conditional branch point. If line 1 was not active, control is transferred directly to the next conditional branch point.

The above procedure is repeated until all N lines have been evaluated and all the addresses of the disk sectors to be outputted for the active lines have been cataloged. The cataloged disk sectors are to be loaded into the core buffer stages during the current system cycle. Then, control is transferred to operational block 11-9.

Operational block 11-9 calls-up the disk driver routine which is also set out in the Appendix. The disk driver routine operates to read the disk sectors corresponding to the previously cataloged addresses into the core buffer stages assigned to the respective active lines. Thereafter, control is transferred to conditional branch point 11-10.

Conditional branch point 11-10 performs an evaluation to determine if there are any additional voice sectors to be outputted during the present system cycle. If there are none, control is transferred to operational block 11-12 and the NXTLST routine is terminated. If one or more sectors remain to be outputted, control is transferred via read operational block 11-11 to the disk driver operational block 11-9. The disk driver operates, as described above, to read the next disk sector to be outputted. This procedure is repeated until all the cataloged disk sectors have been read into the appropriate core buffer stages during the current system cycle. Thereafter, control is transferred to operational block 11-12 and the NXTLST routine is terminated.

The NXTLST routine is activated during each system cycle in response to an interrupt signal generated by multiplexer 16.

APPENDIX

```
;DMAMUX DRIVER
;
        MUXCS=164208              ;DMAMUX CONTROL&STATUS REG ADDRESS
;
LOBUF:  MOV    #VBTBL,VBTBL-2     ;LOAD VBTBL-2 WITH ADDRESS OF
                                  ;TABLE HOLDING IN ITS SUCCESSIVE
                                  ;NODES THE SUCCESSIVE ADDRESSES
                                  ;OF THE LOW BANK VOICE BUFFERS
        JMP    NXTLST
HIBUF:  MOV    #VBTBL+(2*TLINES),VBTBL-2   ;LOAD VBTBL-2 WITH
                                  ;ADDRESS OF
                                  ;TABLE HOLDING IN ITS SUCCESSIVE
                                  ;NODES THE SUCCESSIVE ADDRESSES
                                  ;OF THE HIGH BANK VOICE BUFFERS
        JMP    NXTLST
;
;
;
;===========================================================
;DISK DRIVER
;
;  DISK CONTROLLER REGISTER ADDRESSES
        DCS=177460                ;DISK CONTROL&STATUS
        WCR=177462                ;WORD COUNT REGISTER
        MAR=177464                ;CURRENT MEMORY ADDRESS REGISTER
        DAR=177466                ;DISK ADDRESS REGISTER
        DAE=177470                ;DISK ADDR EXTENSION-ERROR REG
        ADS=177476                ;ADDRESS OF DISK SECTOR
;
RTRCNT: .WORD 10                  ;8 TRIES ALLOWED FOR DITPAR-MISSED
                                  ;TRANSFER TO RECTIFY ITSELF
DSKDRV: TST    DCS                ;IS INTERRUPT DUE TO ERROR?
        BMI    DSKERR             ;IF YES,THEN GOTO INVESTIGATE
                                  ;SOURSE OF ERROR
DSK:    MOV    #10,RTRCNT         ;ELSE,REINITIALIZE RETRY COUNT
        TST    DANXT-2            ;TEST COUNT OF DA'S YET TO BE
                                  ;OUTPUT DURING PRESENT DMAMUX CYCL
        BEQ    DRVXIT             ;IF COUNT IS ZERO EXIT DRIVER
DS:     MOV    R0,-(SP)           ;ELSE, SAVE REGISTERS R0-R2
        MOV    R1,-(SP)
        MOV    R2,-(SP)
        MOV    ADS,R0             ;AND ENTER 'READ SCHEDULER'
        ASR    R0                 ;(R0)=CURRENT DISK POSITION IN
                                  ;256W SECTORS(VOISECTORS)
        TST    SECTBL-4           ;FIRST DISK SEARCH DURING
                                  ;CURRENT DMAMUX CYCLE?
        BEQ    ONESEC             ;IF NOT,...
        CLR    SECTBL-4           ;ELSE CLEAR FIRST SEARCH FLAG,
        ADD    #2,R0              ;AND PROBE TWO VOISECTORS AHEAD
        BR     TWOSEC             ;
ONESEC: INC    R0                 ;...PROBE ONE VOISECTOR AHEAD
TWOSEC: BIC    #177720,R0         ;MODULO VOISEC(=16. FOR THE
                                  ;RPC DISK)
        MOV    R0,R1              ;SAVE PROBED SECTOR IN R1
        ASL    R0                 ;
        MOV    SECTBL(R0),R2      ;RETRIEVE ADDRESS OF ACTIVITY
                                  ;TABLE FOR SECTOR,I.E...(R2)=SCTR#
        TST    2(R2)              ;IS PROBED SECTOR TO BE READ NEXT?
        BNE    LOADSK             ;IF YES,THEN GO LOAD DISK
NXTSEC: INC    R1                 ;ELSE CHECK ALL SUBSEQUENT
        BIC    #177720,R1         ;SECTORS SEQUENTIALLY
        MOV    R1,R0              ;UNTIL POSSIBLY ALL OF THEM
        ASL    R0                 ;HAVE BEEN
        MOV    SECTBL(R0),R2      ;CHECKED FOR
        TST    2(R2)              ;THE NEXT 'READ'
        BEQ    NXTSEC
LOADSK: MOV    R2,SECTBL-2        ;SAVE ACTIVE SCTR#
        DEC    (R2)               ;DECR PNTR IN SCTR#,
        DEC    2(R2)              ;DECR CNT OF ADDRESSES YET TO BE
                                  ;READ FROM SCTR#,
```

```
        DEC     DANXT-2             ;DECR TOTAL CNT OF DA'S YET
                                    ;REMAINING
        MOVB    @(R2),R1            ;GET IN R1 LIN# TO BE VOICED
        ASL     R1
        MOV     R1,R0               ;
        ADD     VBTBL-2,R1          ;GET ADDRESS OF THE PERTINENT
                                    ;VOICEBUFFER ADDRESS,I.E.,
                                    ;(R1)=ADDROF APPROPRIATE VB*(L!H)
        MOV     (R1),MAR            ;LOAD MAR
        MOV     DANXT(R0),R1        ;(R1)=DA IN 32W BLOCKS
        ASL     R1                  ;MULTIPLY THIS ADDRESS
        ASL     R1                  ;BY 32 WHILE COLLECTING
        ASL     R1                  ;THE 3 HIGH ORDER BITS
        ROL     R1                  ;THAT OVERFLOW
        ROL     R1                  ;BY LEFT ROLLING
        MOV     R1,R2               ;R1
        BIC     #3,R2               ;(R2)=COMPONENT OF DA TO GO INTO
                                    ;DAR
        MOV     R2,DAR              ;LOAD DAR
        ROL     R1
        BIC     #177770,R1          ;ISOLATE THE 3 HIGH ORDER BITS OF
                                    ;DA
        BIC     #7,DAE              ;CLEAR THE 3 LOW ORDER BITS OF DAE
        BIS     R1,DAE              ;AND LOAD DAE
        MOV     #-VBKSZW,WCR        ;LOAD WCR WITH COUNT(IN 2'S COMPL)
                                    ;OF WORDS TO BE TRANSFERED
        MOV     #105,DCS            ;SET READ FUNCTION AND GO
        MOV     (SP)+,R2            ;RESTORE REGISTERS R2-R0
        MOV     (SP)+,R1
        MOV     (SP)+,R0
DRVXIT: RTI                         ;AND RETURN
;
;   DISK ERROR ROUTINE
DSKERR: BIT     #11000,DCS          ;DATPAR -MISSED TRANSFER ERROR?
        BEQ     HEROUT              ;IF NOT OUTPUT MESSAGE FOR HARD
                                    ;DISK ERROR
        DEC     RTRCNT              ;ELSE,REINITIALIZE SAME TRANSFER
                                    ;A MAXIMUM OF 8 TIMES
        BEQ     PEROUT              ;IF ERR COND NOT CORRECTED
                                    ;TERMINATE FURTHER TRANSFERS
        MOV     SECTBL-2,R2         ;ELSE SET (R2)=SCTR# JUST ABORTED
        INC     (R2)                ;INCR POINTER IN SCTR#
        INC     2(R2)               ;INCR CNTR IN SCTR#
        INC     DANXT-2             ;AND DANXT COUNTER
        BIS     #400,DCS            ;CLEAR DISK
        BR      DS                  ;AND RETRY TRANSFER
HEROUT: JSR     R5,EMHNDL           ;OUTPUT HARD ERROR MESSAGE
        .WORD   HRDERR
        JMP     START
PEROUT: JSR     R5,EMHNDL           ;OUTPUT PERSISTENT PAR-MISSED
                                    ;TRANSFER ERROR MESSAGE
        .WORD   PARERR
        JMP     START
;
EMHNDL: MOV     (R5)+,R0
EM:     TSTB    TPS
        BPL     EM
        MOVB    (R0)+,TPB
        BNE     EM
        RTS     R5
HRDERR: .ASCIZ  <CR><LF>/HARD DISK ERROR/<CR><LF>
PARERR: .ASCII  <CR><LF>/PERSISTENT DATA PARITY-MISSED TRANSFER/
        .ASCIZ  / ERROR/<CR><LF>
        .EVEN
;
;
;
;================================================================
;
;NXTLST SUBROUTINE. ACTIVATED BY DMAMUX ,IT PRODUCES THE
;LIST OF DA'S FROM WHICH THE NEXT SET OF VOICE BLOCKS WILL BE
;OUTPUT AS SPEACH DURING THE NEXT DMAMUX CYCLE
;
NXTLST: MOV     R0,-(SP)            ;SAVE REGISTERS R0-R3
        MOV     R1,-(SP)
```

```
            MOV     R2,-(SP)
            MOV     R3,-(SP)
            CLR     DANXT-2         ;RESET CNTR FOR DA'S COLLECTED
                                    ;DURING PREVIOUS DMAMUX CYCLE
            MOV     #SCTR0+2,R0     ;(R0)=SCTR0+2
            MOV     #VOISEC,R1      ;(R1)=NO OF VOISECTORS ASSIGNED
                                    ;PER DISK TRACK
NEWSEC:     CLR     (R0)+           ;CLEAR COUNTER
            MOV     R0,-4(R0)       ;AND INITIALIZE POINTER
            ADD     #TLINES+2,R0    ;IN EACH VOISECTOR
            DEC     R1              ;ACTIVITY TABLE
            BGT     NEWSEC
            TST     MSG0-10         ;SPEACH TO OUTPUT ON LINE 0?
            BPL     MES0            ;IF YES THEN GO GET ITS DA
T1:         TST     MSG1-10         ;SPEACH TO OUTPUT ON LINE 1?
            BPL     MES1            ;ETC...
T2:         TST     MSG2-10
            BPL     MES2
T3:         TST     MSG3-10
            BPL     MES3
T4:         TST     MSG4-10
            BPL     MES4
T5:         TST     MSG5-10
            BPL     MES5
T6:         TST     MSG6-10
            BPL     MES6
T7:         TST     MSG7-10
            BPL     MES7
TERMIN:     MOV     (SP)+,R3        ;RESTORE REGISTERS R3-R0
            MOV     (SP)+,R2
            MOV     (SP)+,R1
            MOV     (SP)+,R0
            MOV     #1,SECTBL-4     ;SET FIRST DISK SEARCH FLAG
            JMP     DSK
;
MES0:       JSR     R5,GETDA
            .WORD   MSG0
            BR      T1
MES1:       JSR     R5,GETDA
            .WORD   MSG1
            BR      T2
MES2:       JSR     R5,GETDA
            .WORD   MSG2
            BR      T3
MES3:       JSR     R5,GETDA
            .WORD   MSG3
            BR      T4
MES4:       JSR     R5,GETDA
            .WORD   MSG4
            BR      T5
MES5:       JSR     R5,GETDA
            .WORD   MSG5
            BR      T6
MES6:       JSR     R5,GETDA
            .WORD   MSG6
            BR      T7
MES7:       JSR     R5,GETDA
            .WORD   MSG7
            BR      TERMIN
;
;   GETDA SUBROUTINE
GETDA:      MOV     (R5)+,R0        ;(R0)=MSG#
            MOV     -12(R0),R1      ;(R1)=CURRENT VALUE OF PMSG#
BEGIN:      TST     (R1)            ;TEST CONTENTS OF PMSG# POINTER
            BGT     TMFLAG
            BEQ     COPY
            RTS     R5
COPY:       CLR     -6(R0)          ;CLEAR TEMP FLAG
            MOV     -4(R0),(R1)+    ;COPY TEMP BUFFER BACK INTO MSG#
            MOV     -2(R0),(R1)+    ;INTO CURRENT NODE
            MOV     R1,-12(R0)      ;RESTORE VALUE OF POINTER
            BR      BEGIN           ;GO BACK TO TRY NEXT NODE
TMFLAG:     TST     -6(R0)          ;TEST TMFL#
            BNE     TMFLON          ;IF FLAG IS ON...
            MOV     (R1),-4(R0)     ;IF FLAG IS OFF,THEN COPY
            MOV     2(R1),-2(R0)    ;CURRENT NODE INTO TEMP BUFFER
            DEC     -6(R0)          ;AND SET TMFL# TO -1
```

```
TMFLON:  TSTB    (R1)                    ;...TEST CURRENT PHRASE LENGTH
         BHI     LNTHPO                  ;IF PHRASE LENTH IS POSITIVE,***
         DECB    1(R1)                   ;IF NOT THEN DECR SILENCE BY 1
         RTS     R5                      ;AND EXIT NXTLST
LNTHPO:  MOV     -10(R0),R2              ;(R2)=LIN# BEING SERVED
         ASL     R2
         MOV     2(R1),DANXT(R2)         ;ENTER INTO DANXT THE NEXT DA
                                         ;FOR THE LIN# AT HAND AND
         INC     DANXT-2                 ;UPDATE CNTER FOR COLLECTED DA'S
         MOV     2(R1),R2                ;(R2)=CURRENT DA IN 32W BLOCKS
         ASR     R2                      ;DEDUCE THE 256W VOISECTOR
         ASR     R2                      ;CORRESPONDING TO THIS DA
         BIC     #177740,R2              ;AND RETRIEVE IN R3 THE START ADDR
         MOV     SECTBL(R2),R3           ;OF THE ACTIVITY TABLE FOR THE
                                         ;VOISECTOR. (R3)=SCTR#
         MOVB    -10(R0),@(R3)           ;ENTER LIN# UNDER THIS SCTR#
         INC     (R3)+                   ;AND UPDATE POINTER
         INC     (R3)                    ;AND CNTR IN SCTR#
         DEC     (R1)                    ;DECREMENT PHRASE LENGTH
         ADD     #VBKSZS,2(R1)           ;INCR DA TO NEXT VALUE
         RTS     R5                      ;AND EXIT SUBROUTINE
;AVAOS2 MAIN SCHEDULER
;
START:   MOV     #500,SP                 ;SET STACK POINTER
SCHED:   CLR     PSW                     ;SET SCHEDULER PRIORITY AT 0
TCH0:    TST     TTIB0+2                 ;TEST TTIB STATUS FLAG FOR TT0
         BNE     TON0                    ;IF ON, PROCEED TO SERVICE TT0
TCH1:    TST     TTIB1+2                 ;ETC
         BNE     TON1
TCH2:    TST     TTIB2+2
         BNE     TON2
TCH3:    TST     TTIB3+2
         BNE     TON3
TCH4:    TST     TTIB4+2
         BNE     TON4
TCH5:    TST     TTIB5+2
         BNE     TON5
TCH6:    TST     TTIB6+2
         BNE     TON6
TCH7:    TST     TTIB7+2
         BNE     TON7
         BR      TCH0                    ;PROCEED TO NEXT NODE OF SCHEDULER
TON0:    JMP     TONE0
TON1:    JMP     TONE1
TON2:    JMP     TONE2
TON3:    JMP     TONE3
TON4:    JMP     TONE4
TON5:    JMP     TONE5
TON6:    JMP     TONE6
TON7:    JMP     TONE7
;
;TOUCH-TONE® DRIVER
;
;   TOUCHTONE CONTROL-STATUS-DATA REGISTER ADDRESSES
         TCSD0=164000
         TCSD1=164002
         TCSD2=164010
         TCSD3=164012
         TCSD4=164004
         TCSD5=164006
         TCSD6=164014
         TCSD7=164016
;
TT0:     JSR     R5,TTSERV               ;TRANSMIT WITH SUBROUTINE CALL
         .WORD   TTIB0                   ;APPROPRIATE PARAMETERS
         .WORD   MSG0                    ;TO IDENTIFY
         .WORD   TCSD0                   ;INTERRUPTING TOUCHTONE
         RTI
TT1:     JSR     R5,TTSERV
         .WORD   TTIB1
         .WORD   MSG1
         .WORD   TCSD1
         RTI
```

```
TT2:     JSR    R5,TTSERV
         .WORD  TTIB2
         .WORD  MSG2
         .WORD  TCSD2
         RTI
TT3:     JSR    R5,TTSERV
         .WORD  TTIB3
         .WORD  MSG3
         .WORD  TCSD3
         RTI
TT4:     JSR    R5,TTSERV
         .WORD  TTIB4
         .WORD  MSG4
         .WORD  TCSD4
         RTI
TT5:     JSR    R5,TTSERV
         .WORD  TTIB5
         .WORD  MSG5
         .WORD  TCSD5
         RTI
TT6:     JSR    R5,TTSERV
         .WORD  TTIB6
         .WORD  MSG6
         .WORD  TCSD6
         RTI
TT7:     JSR    R5,TTSERV
         .WORD  TTIB7
         .WORD  MSG7
         .WORD  TCSD7
         RTI
;

TTSERV:  MOV    R4,-(SP)        ;SAVE REGISTERS R4-R1
         MOV    R3,-(SP)
         MOV    R2,-(SP)
         MOV    R1,-(SP)
         MOV    (R5)+,R4        ;(R4)=TTIB#
         MOV    (R5)+,R3        ;(R3)=MSG#
         MOV    (R5)+,R2        ;(R2)=TCSD#
         MOV    (R2),R1         ;(R1)=(TCSD#)
         TST    R1              ;TEST TCSD#
         BMI    CHARIN          ;IF CHAR INTERRUPT IS IN ORDER,---
         BIT    #20,R1          ;ELSE,TEST STATUS OF DSR
         BNE    DSRON           ;IF DSR IS ON,...
         BIT    #40,R1          ;ELSE,TEST DTR
         BEQ    SETDTR          ;IF DTR IS OFF,+++
         BIC    #10000,(R2)     ;ELSE,CLEAR AR
         CLR    4(R4)           ;CLEAR VMSF
         CLR    34(R4)          ;CLEAR **F
         MOVB   #-1,-7(R3)      ;STOP MESSAGE BEING VOICED
         BR     RESREG          ;AND EXIT
SETDTR:  BIS    #40,(R2)        ;+++SET DTR
         BR     RESREG
DSRON:   MOV    R4,(R4)         ;...INIT PTTIB# TO TTIB#+42
         ADD    #42,(R4)        ;
         CLR    6(R4)           ;CLEAR ECC(INIT ENTRY CHAR COUNT)
         INC    22(R4)          ;SET AVA INTRODUCTION FLAG
         BR     TSERVX          ;AND EXIT
CHARIN:  TST    34(R4)          ;---TEST **F(TERMIN SESSION) FLAG
         BEQ    PROC
         BR     RESREG
PROC:    TST    0-12(R3)        ;TEST CONTENTS OF PMSG#
         BMI    MSGDON          ;IF <0, GOTO MSGDON
         MOVB   #-1,-7(R3)      ;ELSE, LOCK MSG#SW
MSGDON:  BIC    #177760,R1      ;ISOLATE TT CHAR IN R1
         CMP    #9,,R1          ;IS IT A NUMERAL?
         BGE    NUMER           ;IF YES...
         CMP    #10,,R1         ;IS IT THE ASTERISK?
         BEQ    ASTER           ;IF YES,....
         TST    16(R4)          ;ELSE, TEST *F
```

```
           BNE     TERSES             ;IF *F IS ON, TERMINATE SESSION
           INC     20(R4)             ;ELSE, SET #F
           BR      TSERVX             ;AND EXIT
TERSES:    CLR     16(R4)             ;CLEAR *F
           INC     34(R4)             ;SET **#F
           BR      TSERVX             ;AND EXIT
ASTER:     TST     16(R4)             ;....TEST *F
           BNE     AST                ;IF *F IS ON, &&
           INC     16(R4)             ;ELSE, SET *F
           BR      RESREG
AST:       CLR     16(R4)             ;&& CLEAR *F
           INC     32(R4)             ;SET **F
           BR      TSERVX             ;AND EXIT
NUMER:     TST     16(R4)             ;..TEST *F
           BNE     CNTRLC             ;IF *F IS ON, ++
           CMP     #6,6(R4)           ;ELSE, TEST ECC
           BGT     DEPOS              ;IF ECC IS NOT EXAUSTED,+++
           BR      RESREG             ;ELSE, RETURN
DEPOS:     MOVB    R1,@(R4)           ;+++DEPOSIT NUMERAL IN TTIB*
           INC     (R4)               ;ADVANCE ENTRY POINTER
           INC     6(R4)              ;INCR ECC
           BR      RESREG             ;AND RETURN

CNTRLC:    CMP     #2,R1              ;IS CHAR A CONTROL MUMERAL
           BGE     CNTRL              ;IF YES,......
           CLR     16(R4)             ;ELSE, CLEAR *F
           BR      RESREG             ;AND EXIT
CNTRL:     TST     R1                 ;.....IS IT 0?
           BEQ     ZERO               ;IF YES, THEN GOTO ZERO
           CMP     #1,R1              ;IS IT 1?
           BEQ     ONE                ;IF YES, THEN GOTO ONE
           CLR     16(R4)             ;ELSE, CLEAR *F(ITIS 2)
           INC     26(R4)             ;SET *2F
           BR      TSERVX             ;AND EXIT
ZERO:      CLR     16(R4)             ;CLEAR *F
           INC     30(R4)             ;SET *0F(ERASE)
           BR      TSERVX             ;AND EXIT
ONE:       CLR     16(R4)             ;CLEAR *F
           INC     24(R4)             ;SET *1F
TSERVX:    INC     2(R4)              ;SET TTIB* STATUS FLAG
RESREG:    MOV     (SP)+,R1           ;RESTORE REGISTERS R1-R4
           MOV     (SP)+,R2
           MOV     (SP)+,R3
           MOV     (SP)+,R4
           RTS     R5                 ;AND RETURN
;TOUCH-TONE® INPUT BUFFER MANAGER(TIBMGR)
;
TONE0:     CLR     TTIB0+2            ;CLEAR TTIB0 STATUS FLAG
           JSR     R5,TIBMGR          ;AND JUMP TO SUBROUTINE TIBMGR
           .WORD   TTIB0
           .WORD   MSG0
           JMP     TCH1
TONE1:     CLR     TTIB1+2            ;CLEAR TTIB1 STATUS FLAG
           JSR     R5,TIBMGR          ;AND JUMP TO SUBROUTINE TIBMGR
           .WORD   TTIB1
           .WORD   MSG1
           JMP     TCH2
TONE2:     CLR     TTIB2+2            ;CLEAR TTIB2 STATUS FLAG
           JSR     R5,TIBMGR          ;AND JUMP TO SUBROUTINE TIBMGR
           .WORD   TTIB2
           .WORD   MSG2
           JMP     TCH3
TONE3:     CLR     TTIB3+2            ;CLEAR TTIB3 STATUS FLAG
           JSR     R5,TIBMGR          ;AND JUMP TO SUBROUTINE TIBMGR
           .WORD   TTIB3
           .WORD   MSG3
           JMP     TCH4
TONE4:     CLR     TTIB4+2            ;CLEAR TTIB4 STATUS FLAG
           JSR     R5,TIBMGR          ;AND JUMP TO SUBROUTINE TIBMGR
           .WORD   TTIB4
           .WORD   MSG4
           JMP     TCH5
```

```
TONE5:   CLR    TTIB5+2              ;CLEAR TTIB5 STATUS FLAG
         JSR    R5,TIBMGR            ;AND JUMP TO SUBROUTINE TIBMGR
         .WORD  TTIB5
         .WORD  MSG5
         JMP    TCH6
TONE6:   CLR    TTIB6+2              ;CLEAR TTIB6 STATUS FLAG

.CLR   6(R4)                ;INIT ECC
         MOV    R4,(R4)
         ADD    #42,(R4)             ;INIT PTTIB# TO TTIB#+42
         BR     TERXIT               ;TERMINATE MESSAGE,ETC.
SMC2:    CMP    #4,6(R4)             ;ECC=4?
         BEQ    S2
         BR     OUTINV
S2:      DEC    12(R4)               ;DECR SMC
         MOV    #MCOMPB,R2
         MOV    #CARDNO,(R2)+        ;ENTER 'CARDNO' INTO MCB
         MOV    #2,(R2)+             ;FOLLOW WITH SILENCEOF 2
         JSR    PC,RDNTGR            ;READ THE NUMBER
         MOV    #ENSALE,(R2)+        ;ENTER 'ENSALE'
         CLR    (R2)+                ;FOLLOW WITH 0 SILENCE
         CLR    6(R4)                ;INIT ECC
         MOV    R4,(R4)
         ADD    #42,(R4)             ;INIT PTTIB# TO TTIB#+42
         BR     TERXIT               ;TERMINATE AND EXIT
SMC1:    CMP    #6,6(R4)             ;6 DIGITS ENTERED?
         BEQ    S1B                  ;IF YES, CALL ATTENDANT ETC.
         CMP    #2,6(R4)             ;2 OR MORE DIGITS ENTERED?
         BLE    S1A                  ;IF YES,...
         BR     OUTINV
S1A:     DEC    12(R4)               ;...DECR SMC
         MOV    #MCOMPB,R2
         MOV    #APROVL,(R2)+        ;ENTER 'APROVL' INTO MCB
         MOV    #2,(R2)+             ;FOLLOW WITH SILENCE OF 2
         JSR    PC,SALFMT            ;FORMAT SALES
         JSR    PC,RDDCML            ;READ INTO MCB
         MOV    #3,-2(R2)            ;FOLLOW WITH SILENCE OF 3
         MOV    #AUTHRN,(R2)+        ;ENTER 'AUTHRN'
         MOV    #2,(R2)+             ;FOLLOW WITH SILENCE OF 2
;
;   NOW ENTER ONE OF TWO AUTHORIZATION NUMBERS INTO TTIB#
;   SO THAT YOU CAN READ IT BY THE RDNTGR SUBROUTINE
         MOV    #4,6(R4)             ;INIT ECC WHICH WAS DEPLETED
                                     ;DURING PREVIOUS EXEC OF RDNTGR
         TSTB   MCOMPB-6
         BEQ    LTHUN
GREHUN:  MOV    #1001,42(R4)         ;1275 IS AUTH NO ON SALE>=100
         MOV    #2407,44(R4)         ;
         JSR    PC,RDNTGR            ;READ AUTH NO INTO MCB AND EXIT
         BR     TERXIT
LTHUN:   MOV    #3002,42(R4)         ;2463 IS AUTH NO ON SALE<100
         MOV    #1406,44(R4)         ;
         JSR    PC,RDNTGR            ;READ AUTHORIZATION NO
         BR     TERXIT               ;AND EXIT
S1B:     DEC    12(R4)               ;DECR SMC
         MOV    #ATTEND,MCOMPB
         CLR    MCOMPB+2
         MOV    #-1,MCOMPB+4
         JSR    PC,MCBTRN
         MOV    #TIMOUT,14(R4)       ;INIT AR COUNTDOWN COUNTER
         INC    4(R4)                ;SET VMSF
         RTS    R5                   ;AND RETURN
```

What is claimed is:

1. Output apparatus for initiating and effecting reading digital code words from registers in a plurality of dedicated buffer storage stages in a memory unit of a computer system to a corresponding plurality of output lines, wherein the registers have preassigned addresses identifying the individual buffer storage stages and the digital word locations within the buffer storage stages, which comprises:

monitoring means responsive to first prescribed address signals transmitted in the computer system when digital words are transferred from a mass storage unit to said registers in the buffer storage stages in the memory unit for generating output signals indicating individual ones of the dedicated buffer storage stages which include registers which have been loaded with digital words from said mass storage unit to be outputted;

first means for generating a predetermined sequence of output signals during first periodic intervals, first predetermined ones of said first means output signals being second address signals identifying the individual registers in the dedicated buffer storage stages;

scanning means supplied with said output signals from said monitoring means and responsive to second predetermined ones of said sequence of first means output signals for sequentially generating initiation signals during second periodic intervals identifying buffer storage stages that have been loaded with digital words; and means for generating a plurality of control signals, said control signals being employed to effect reading digital words from the registers in the loaded buffer storage stages in a prescribed sequence, said control signal generating means including means responsive to each of said initiation signals for normally generating a sequence of first predetermined ones of said control signals for causing reading of a digital word from a register in a loaded buffer storage stage corresponding to said second address signals being generated at the instant a corresponding one of said initiation signals is generated, wherein a digital word is read from a register in each of said loaded buffer storage stages during each of said second periodic intervals in response to corresponding ones of said initiation signals.

2. The output apparatus as defined in claim 1 wherein said monitoring means includes controllable decoding means responsive to said first address signals for generating output signals indicative of buffer storage stages that have been loaded during said first periodic intervals and means having a plurality of outputs of temporarily storing said controllable decoding means output signals so that said controllable decoding means output signals generated during individual ones of said first periodic intervals are stored and available at said storing means outputs during the next subsequent ones of said first periodic intervals, wherein said monitoring means output signals are developed at said storing means outputs.

3. The output apparatus as defined in claim 2 wherein said scanning means includes comparator means having a plurality of stages, each stage of said comparator means corresponding on a one-to-one relationship to a preassigned one of said output lines and each stage of said comparator means being in a predetermined one-to-one circuit relationship with the outputs of said storing means, and decoder means supplied with said second predetermined ones of said sequence of said first means output signals for generating a predetermined sequence of scanning signals during said second periodic intervals, said scanning signals being supplied to said comparator means for enabling the individual stages of said comparator means sequentially during said second periodic intervals, wherein outputs from said comparator means represent said initiation signals corresponding to buffer storage stages which include registers that have been loaded.

4. The output apparatus as defined in claim 3 wherein the memory unit in the computer system includes first and second segments each having a preassigned address and including a plurality of buffer storage stages having preassigned addresses and being arranged in sequential order, the addresses of the individual buffer storage stages in each memory segment being identical to a corresponding buffer storage stage in the other memory segment except for the segment address bit, and wherein a third predetermined one of said first means output signals indicates the memory segment being loaded and the memory segment to be unloaded during said first periodic intervals, and wherein said monitoring means further includes means for comparing first predetermined bits of said first address signals supplied to said output apparatus during transfers of digital words from the mass storage unit to the memory unit to a combination of prescribed signals, said prescribed signals including preset signals representative of predetermined bits of said first and second memory segment addresses, said third predetermined one of said first means output signals and a first predetermined one of said sequence of control signals for generating a signal to enable said controllable decoding means to decode second predetermined bits of said first address signals representative of buffer storage stages including registers being loaded during said first periodic intervals.

5. The output apparatus as defined in claim 4 further including a plurality of storage means connected in one-to-one circuit relationship with said output lines and corresponding in one-to-one relationship to said buffer storage stages in the memory unit, and means responsive to said scanning means output signals and a second predetermined one of said sequence of control signals for controllably enabling corresponding ones of said storage means in said prescribed output sequence so that individual digital words are read from registers in said loaded buffer storage stages to corresponding ones of said storage means in said prescribed sequence.

6. The output apparatus as defined in claim 5 further including controllable means supplied with said second address signals identifying a register in a buffer storage stage corresponding to the initiation signal currently being generated and being responsive to a third predetermined one of said sequence of control signals for selectively supplying said supplied second address signals to the memory unit so that a digital word stored in said identified register in one of said buffer stages corresponding to said supplied second address signals is read to the corresponding one of said storage means.

7. In an inquiry response system of the type employing a computer arrangement including a central processor, a memory unit, and a mass storage unit separate from the memory unit, the processor being arranged in conjunction with the memory unit for responding to incoming inquiries, determining appropriate response messages, and directing the mass storage unit to supply blocks of digital words representing message segments stored in the mass storage unit to registers in dedicated buffer storage stages in the memory unit, wherein the registers and dedicated buffer storage stages have preassigned addresses, output apparatus for reading digital words from registers in loaded ones of the buffer storage stages to corresponding ones of a plurality of output lines which comprises:

monitoring means responsive to first address signals communicated in the computer arrangement when digital words are being transferred from the mass storage unit to said registers in the buffer storage stages in the memory unit for generating output signals indicating individual ones of the buffer storage stages which include registers that have been loaded with digital words from said mass storage unit to be outputted;

first means having a plurality of outputs for generating a predetermined sequence of signals during first periodic intervals, signals developed at first predetermined ones of said first means outputs being second address signals identifying registers in the dedicated buffer storage stages;

scanning means supplied with said output signals from said monitoring means for sequentially generating initiation signals representative of said loaded buffer storage stages during second periodic intervals; and means for generating a plurality of control signals for effecting reading the digital words from the registers in said loaded buffer storage stages to corresponding ones of the output lines in a prescribed sequence, said control signal generating means including means responsive to each of said initiation signals for normally generating a sequence of predetermined ones of said control signals for controlling the memory unit to transfer a digital word from a register in a loaded buffer storage stage identified by said second address signals to the corresponding one of said output lines, wherein a digital word is transferred from a register in each of said loaded buffer storage stages during each of said second periodic intervals in response to corresponding ones of said initiation signals.

8. The system as defined in claim 7 further including controllable means for selectively supplying said second address signals to the memory unit in response to a first predetermined one of said sequence of control signals for effecting reading the digital words from the loaded buffer storage stages and registers corresponding to the supplied second address signals to corresponding ones of the output lines in said prescribed sequence corresponding to said second address signal generation sequence, wherein only ones of said second address signals identifying registers in loaded ones of said buffer storage stages corresponding to said initiation signals are supplied from said output apparatus to the memory unit, and means responsive to a signal developed at a second predetermined one of said first means outputs at the termination of each of said first periodic intervals for generating a signal for interrupting the processor at the termination of each of said first periodic intervals for effecting a transfer of blocks of digital words stored in the mass storage unit to registers in ones of the buffer storage stages in the memory unit corresponding to lines on which requests have been received.

9. The system as defined in claim 8 wherein said monitoring means further includes controllable decoding means responsive to said first address signals for generating output signals indicative of buffer storage stages that have been loaded during said first periodic intervals and means having a plurality of outputs for temporarily storing said controllable decoding means output signals so that said controllable decoding means output signals generated during individual ones of said first periodic intervals are stored and available at said storing means outputs during the next subsequent ones of said first periodic intervals, wherein said monitoring means output signals are developed at said storing means outputs.

10. The system as defined in claim 9 wherein said scanning means includes comparator means having a plurality of stages, each stage of said comparator means corresponding on a one-to-one relationship to a preassigned one of said output lines and each stage of said comparator means being in a predetermined one-to-one circuit relationship with the outputs of said storing means, and decoder means supplied with signals developed at third predetermined ones of said first means outputs for generating a predetermined sequence of scanning signals during said second periodic intervals, said scanning signals being supplied to said comparator means for enabling the individual stages of said comparator means sequentially during said second periodic intervals, wherein outputs from said comparator means represent said initiation signals corresponding to buffer storage stages which include registers that have been loaded.

11. The system as defined in claim 10 wherein the memory unit in the computer system includes first and second segments each having a preassigned address and including a plurality of buffer storage stages having preassigned addresses and arranged in sequential order, the addresses of the individual buffer storage stages in each memory segment being identical to a corresponding buffer storage stage in the other memory segment except for the segment address bit, and wherein a signal developed at a fourth predetermined one of said first means outputs indicates the memory segment being loaded and the memory segment to be unloaded during said first periodic intervals, and wherein said monitoring means further includes means for comparing first predetermined bits of said first address signals supplied to said output apparatus during transfers of digital words from the mass storage unit to the memory unit to a combination of prescribed signals, said prescribed signals including preset signals representative of predetermined bits of said first and second memory segment addresses, said signal developed at said fourth predetermined one of said first means outputs and a second predetermined one of said sequence of control signals for generating a signal to enable said controllable decoding means to decode second predetermined bits of said first address signals representative of buffer storage stages including registers being loaded during said first periodic intervals.

12. The system as defined in claim 11 further including a plurality of storage means connected in one-to-one circuit relationship with said output lines and corresponding in one-to-one relationship to said buffer storage stages in the memory unit and means responsive to said scanning means output signals and a third predetermined one of said sequence of control signals for controllably enabling corresponding ones of said storage means in said prescribed output sequence so that individual digital words are read from registers in said loaded buffer storage stages to corresponding ones of said storage means in said prescribed sequence.

13. The system as defined in claim 12 wherein the blocks of digital words stored in sectors of the mass storage unit are coded representations of segments of speech signals, each such segment representing a portion of a speech phrase approximately equal in duration to one of said first periodic intervals cycles, and further including a plurality of means in one-to-one circuit relationship with said output storage means for converting digital signals supplied from said storage means into audio signals.

* * * * *